INVENTORS
WALDO H. KLIEVER
BY WEBSTER G. ROBERTS
Max L. Wymore
AGENT

Nov. 15, 1960 W. H. KLIEVER ET AL 2,960,689

BINARY SCALE READER

Filed March 22, 1956 12 Sheets-Sheet 2

INVENTOR.
WALDO H. KLIEVER
BY WEBSTER C. ROBERTS
Max L. Wymore
AGENT

INVENTORS
WALDO H. KLIEVER
WEBSTER C. ROBERTS
BY Max L. Wymore
AGENT

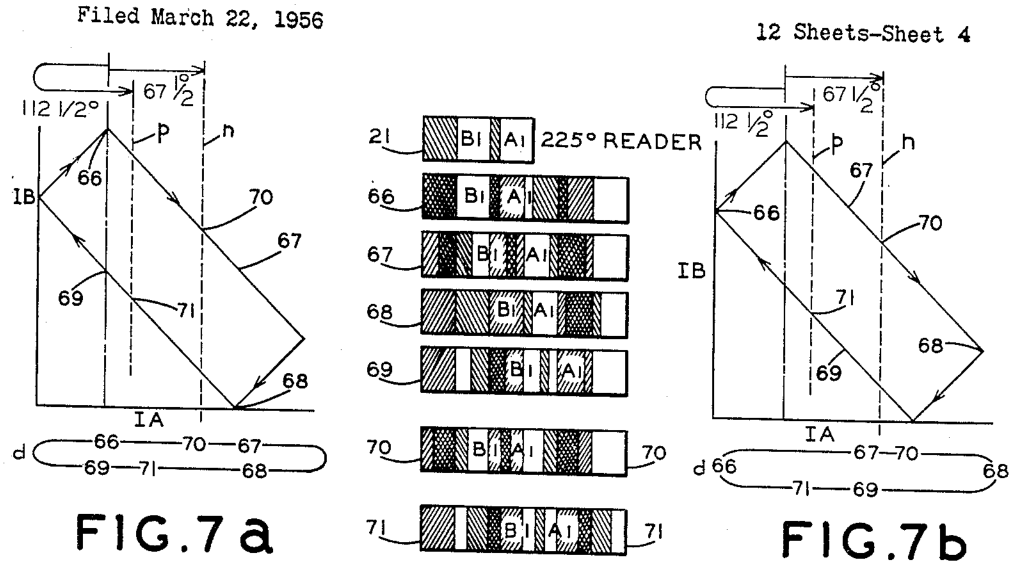
FIG. 7a, FIG. 7b
FIG. 7
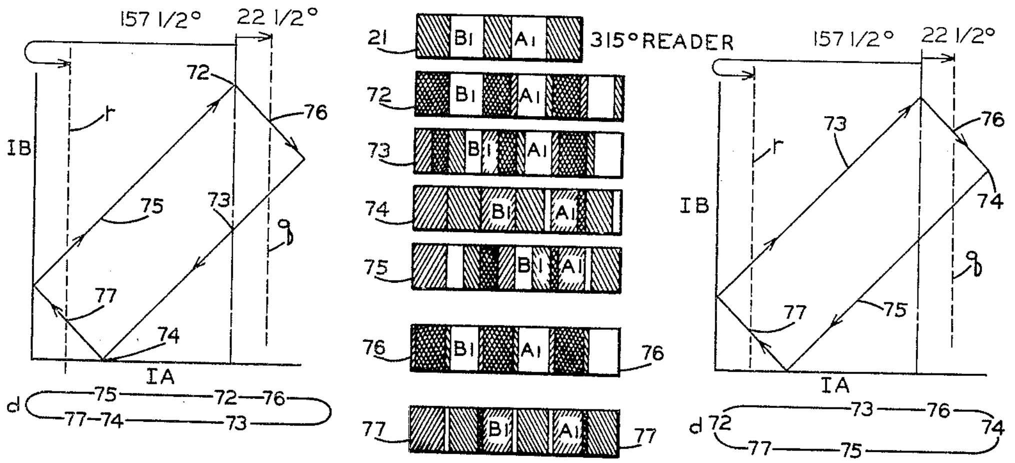
FIG. 8a, FIG. 8, FIG. 8b
INVENTORS
WALDO H. KLIEVER
WEBSTER C. ROBERTS
BY Max L. Wymore
AGENT

*INVENTORS*
WALDO H. KLIEVER
WEBSTER C. ROBERTS
*BY* Max L. Wymore
AGENT

Nov. 15, 1960 W. H. KLIEVER ET AL 2,960,689

BINARY SCALE READER

Filed March 22, 1956 12 Sheets-Sheet 6

INVENTORS
WALDO H. KLIEVER
WEBSTER C. ROBERTS
BY Max L. Wymore
AGENT

INVENTORS
WALDO H. KLIEVER
WEBSTER C. ROBERTS
BY Max L. Wymore
AGENT

Nov. 15, 1960 W. H. KLIEVER ET AL 2,960,689

BINARY SCALE READER

Filed March 22, 1956 12 Sheets-Sheet 8

INVENTORS
WALDO H. KLIEVER
WEBSTER C. ROBERTS
BY Max L. Wymore
AGENT

INVENTORS
WALDO H. KLIEVER
WEBSTER C. ROBERTS
BY Max L. Wymore
AGENT

INVENTORS
WALDO H. KLIEVER
WEBSTER C. ROBERTS
BY Max L. Wymore
AGENT

INVENTORS
WALDO H. KLIEVER
WEBSTER C. ROBERTS
BY Max L. Wymore
AGENT

Nov. 15, 1960 W. H. KLIEVER ET AL 2,960,689

BINARY SCALE READER

Filed March 22, 1956 12 Sheets-Sheet 12

INVENTORS
WALDO H. KLIEVER
WEBSTER C. ROBERTS
BY Max L. Wymore
AGENT

United States Patent Office 2,960,689

Patented Nov. 15, 1960

2,960,689

BINARY SCALE READER

Waldo H. Kliever, Cleveland Heights, and Webster C. Roberts, South Euclid, Ohio, assignors to Clevite Corporation, Cleveland, Ohio, a corporation of Ohio Filed Mar. 22, 1956, Ser. No. 573,154

26 Claims. (Cl. 340—347)

This invention relates to an improved scale reader and more particularly to a reader for a natural binary scale adapted to be employed with a natural binary scale to provide unambiguous signals representative of the position of the reader with respect to the scale. Either the reader or the scale may be mounted upon a linear displaceable member of a device, such as a machine tool, for example, and the other mounted upon a fixed portion of a machine tool. By means of a group of signals developed representative of the position of the scale and the reader with respect to each other, it is possible to identify the position of the displaceable element with respect to the fixed portion of the machine tool. This lends itself to the precision automatic positioning of machine tool elements, highly desirable in the art of automation.

The natural binary scale has $r$ columns of effectively transparent and effectively opaque areas arranged in a natural binary progression, each having $2^n$ rows, where $n$ is the number of binary digits in the scale. The natural binary progression is one in which the effectively transparent and effectively opaque areas are disposed in columns such that each column represents ascending powers of two.

Where data is a number in the binary system, or scale of two, in which only the digits 0 and 1 occur, the number 2 in the normal decimal scale corresponds to the number 10 in the binary scale, and may be represented by the simultaneous states of two signals, the first of which is in the 1-state and the second in the 0-state. Similarly, the decimal scale number 3 is represented by both signals being in the 1-state and the decimal number 4 by three signals, the first of which is in the 1-state and the other two in the 0-state.

The signals may have a variety of physical forms, depending on the scale and reader, usually electrical or mechanical in nature, although signals of an optical, magnetic or other nature could be employed if desired. The data in the form of signals is commonly transmitted from an input or source to an output by way of one or more channels in the form of pulses which again may assume various physical forms. The absence of a pulse, in the ordinary significance of the term, on any significant channel or at any significant instant, may represent a digit 0 in the appropriate place in a number, and may also be regarded as the "pulse" or like phenomenon in the same way as that which represents the digit 1, since it has a discrete and unique interpretation.

From this it follows that, if a digit—say, 0—is to be represented by the absence of a pulse in a significant place in the pattern, the corresponding effectively opaque or effectively transparent area may be physically indistinguishable from its general background—for example, if the effectively opaque or effectively transparent areas appear respective on an effectively opaque or effectively transparent backing, an effectively opaque or effectively transparent area representing the digit 0 is constituted by a significant zone of the surface of the backing which may not be specifically defined by a boundary. The term effectively opaque or effectively transparent area is to be understood as including such a significant, though physically undefined, zone.

In this specification, the term "effectively opaque area" or "effectively transparent area" will be used to signify any durable discrete phenomena which is capable of identification and presentation as a signal to which a unique interpretation can be assigned. Such areas are to be understood as being effectively transparent or opaque to all forms of electromagnetic energy as well as physical movement. The process of identification and presentation will be termed herein "reading" and the term "durable" is intended to indicate that the effectively opaque areas and effectively transparent areas are not destroyed or changed by the reading process. A signal may be constituted by an electrical pulse or a mechanical displacement or any other identifiable occurrence such as an optical, magnetic or audible effect. A group or train of signals will be understood to include the case of a single signal or the absence of a signal in a single significant place where such a single significant place has a definite or discrete interpretation. The term "decimal digit position" is used to identify a particular row. A natural binary scale having five columns will have 25 or 32 rows corresponding to 32 digit positions ranging from digit 0 position to digit 31 position.

The present invention is primarily concerned with a reader which, when read in conjunction with a natural binary scale, generates signals which represent, in digital form, the data to be transmitted. This data may have any desired significance but frequently represents the instantaneous position of a movable member, or the value of a function such as a trigonometrical ratio of an angular displacement of a rotatable member.

Preferably the binary scale and reader are constituted by areas representing a change in the characteristic of a surface and the reading means comprises means for detecting and responding to the said change.

The change may be of an optical nature and the reading means may comprise a light-sensitive element responsive to the optical change. Thus, for example, the binary scale and reader may comprise a plurality of transparent areas on a generally opaque background, or vice versa. The reading means may then comprise one or more light sources and one or more photo-cells located on opposite sides of the scale and the reader and a means is provided for causing relative movement between the scale and reading means. Where the reading means comprises single light sources and a plurality of photo-cells the reading may be accomplished by switching the photo-cells. Where the reading means comprises single photo-cells and a plurality of light sources the reading may be accomplished by switching the light sources. Where the reading means comprises both a plurality of light sources and a plurality of photo-cells, either the light sources or photo-cells may be switched to accomplish reading as will be understood by those skilled in the art.

Commonly, the reader used with a natural binary scale constructed with opaque areas representing binary "0" and transparent areas representing binary "1," comprises a single transparent area or slit traversing the columns of the scale parallel to the rows. The dimension of said area, measured along the column, is generally the same as the dimension of the transparent area of the column having the finest divisions or as commonly known in the art as the least significant column, since it represents the least significant digit. As the scale is traversed by the reader each segment of the columns in the row defined by the reader is in turn exposed to the light source and a photo-cell. Thus, if a row in a scale of five columns, were read in proper sequence such that the readings were:

1st column—opaque
2nd column—transparent
3rd column—transparent
4th column—opaque
5th column—transparent this would correspond to the binary number 10110 or the decimal number 22. This row then would be the decimal digit 22 position. In writing numbers in the binary scale, the usual convention of placing the most significant number first will be adopted throughout this specification.

In the natural binary scale such as shown in Fig. 1, in moving the above reader slit from row 15 to row 16, a change from transparent to opaque occurs in the first four columns, and the change from opaque to transparent occurs in the fifth column. If the light-sensitive element reading the fifth column be delayed in noting the change in the fifth column, a signal is produced misapprehending all five columns as being opaque giving a decimal digit reading of 0 instead of 16.

While certain prior art binary scales, such as the reflected binary scale, have been designed to obviate this difficulty by using a code which permits a change in only one column in progressing from one number to another, they have several other disadvantages. The first disadvantage is that the code cannot readily be used for arithmetic purposes. A conversion to the natural binary code is required before arithmetic can be readily accomplished. Secondly, its accuracy is limited by the accuracy of the divisions in all the columns, and since all columns must be read with the same accuracy as the column having the finest divisions, skewing between the reader and the scale cannot be tolerated. This places serious tolerance restrictions on the manufacture and mechanical mounting of such a scale and its associated reader. Thirdly, because the more significant columns can only be resolved on the small reader slit, the amount of light which can be directed to the light sensitive element is limited, thus limiting the sensitivity obtainable. The natural binary scale if read in the normal manner also has some of the disadvantages of the reflected binary scale in addition to its ambiguity.

It is the object, therefore, to provide an improved reader for a natural binary scale which avoids one or more of the disadvantages of the prior art arrangements and will permit unambiguous reading.

It is a further object of this invention to provide an improved reader for a natural binary scale which will permit a higher resolution than that defined by the finest division on the scale.

It is a further object of this invention to provide an improved reader for a natural binary scale which will provide higher sensitivity in reading.

It is a further object of this invention to provide an improved reader for a natural binary scale which will provide increased reading accuracy while at the same time permitting greater tolerance in manufacture and mechanical mounting without adversely affecting reading accuracy.

In accordance with the invention, the improved reader for use with a natural binary scale may comprise a plate having a plurality *n* of columns of effectively opaque and effectively transparent durable areas, where *n* is the number of digits in the binary scale, adjacent columns progressing from one side of the reader connoting successively greater digital significance. The reader has one class of such reader areas disposed about a center line, the reader areas in each column more significant than the least significant column of the reader being identically finite and less than the dimension, measured along the column, of like areas of the corresponding column of the natural binary scale with which it is to be used. The reader areas occur in each direction, along the column, away from the center line in the same cyclic repetition as the like areas of the corresponding column of the natural binary scale with which the reader is to be used, the resulting array of said reader areas in each column of the reader more significant than the least significant column of the reader being symmetrically disposed about the center line. The reader areas of the least significant column of the reader are identically finite and up to twice the dimension, measured along the column, of like areas of the least significant column of the natural binary scale with which the reader is to be used and occur in the same cyclic repetition.

The invention will be more clearly understood from the following description, given by way of example only, of various embodiments thereof, reference being directed to the accompanying drawings in which.

Figure 3:
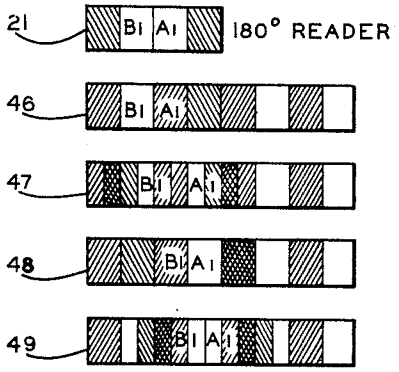
Figure 3 represents diagrammatically the light patterns directed to two photo-cells A1 and B1 each coincident with transparent areas to one side of a center line of the least significant column of a 180° reader according to this invention, reading the least significant column of a natural binary scale such as shown in Figure 1.
Figure 3A:
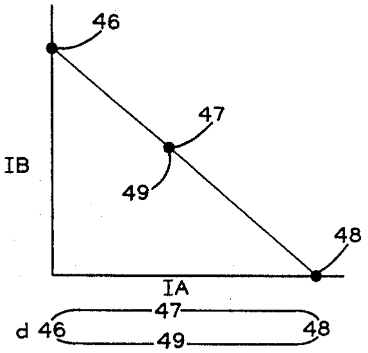

Figure 3*a* shows the phase relationship of light intensities IA and IB directed respectively to the two photo-cells A1 and B1 each coincident with the transparent areas to each side of the center line of the 180° reader of Figure 3, plotted against distance *d*.

Figures 1, 2:
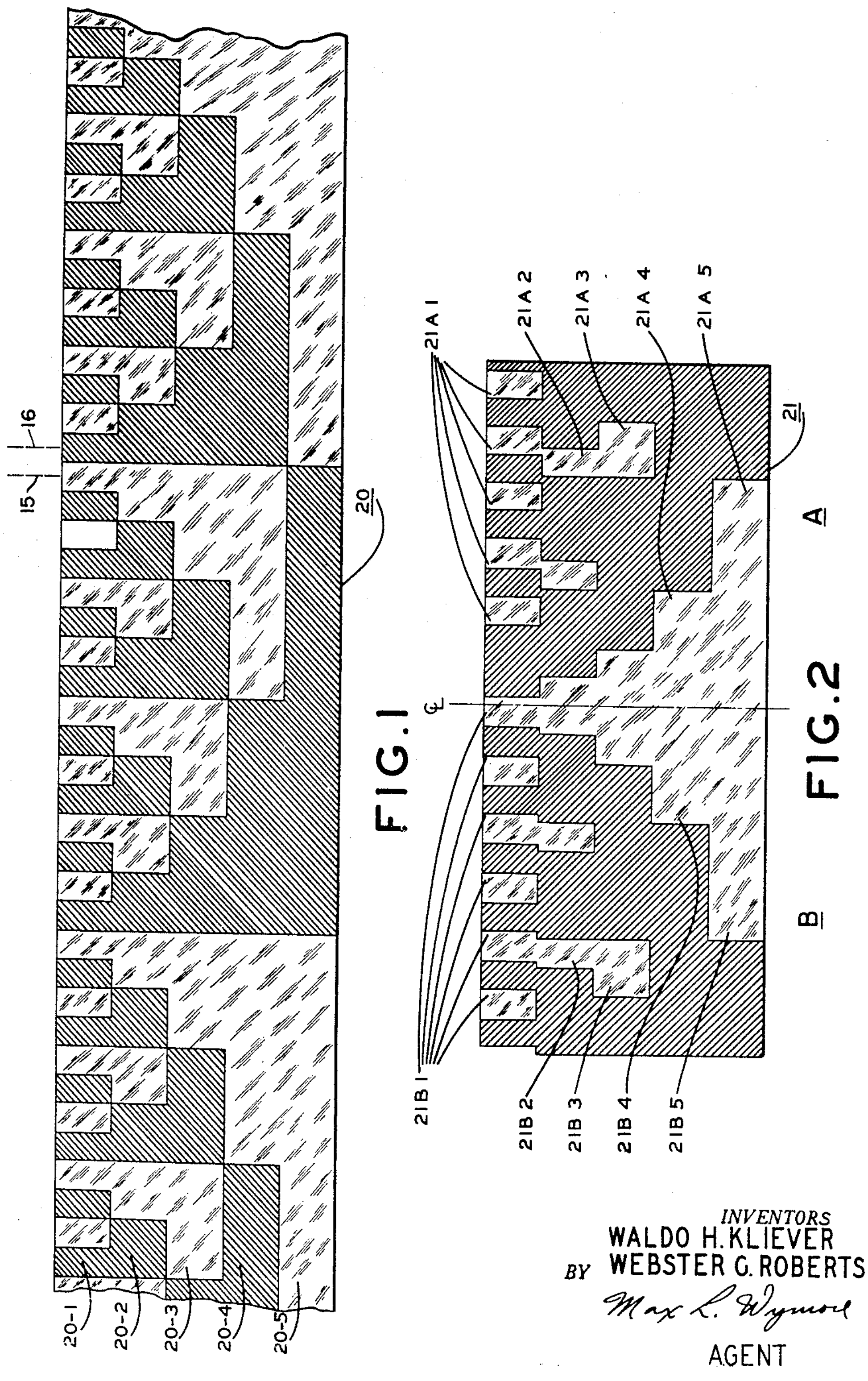
Figure 1 illustrates a pattern of effectively opaque and effectively transparent areas arranged in a natural binary code of 5 digits which represents on the binary scale the decimal digits 0 to 31.
Figure 2 illustrates a pattern of effectively opaque and effectively transparent areas arranged according to one embodiment of the improved binary scale reader of this invention.
Figure 4:
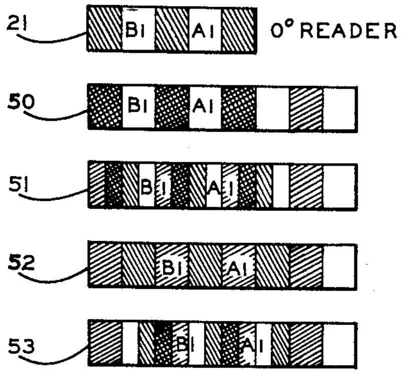

Figure 4 represents diagrammatically the light patterns directed to two photo-cells A1 and B1 each coincident with transparent areas to one side of a center line of the least significant column of a 0° reader according to this invention, reading the least significant column of a natural binary scale such as shown in Figure 1.

Figure 4A:
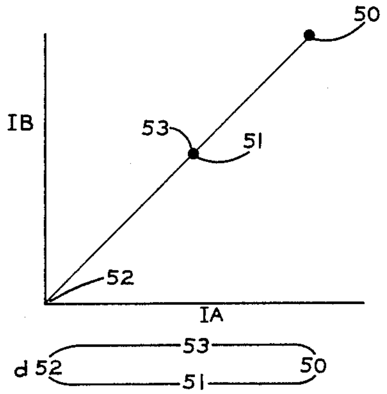

Figure 4*a* shows the phase relationship of light intensities IA and IB directed respectively to the two photo-cells A1 and B1 each coincident with the transparent areas to each side of the center line of the 0° reader of Figure 4, plotted against distance *d*.

Figures 5, 5A, 5B:
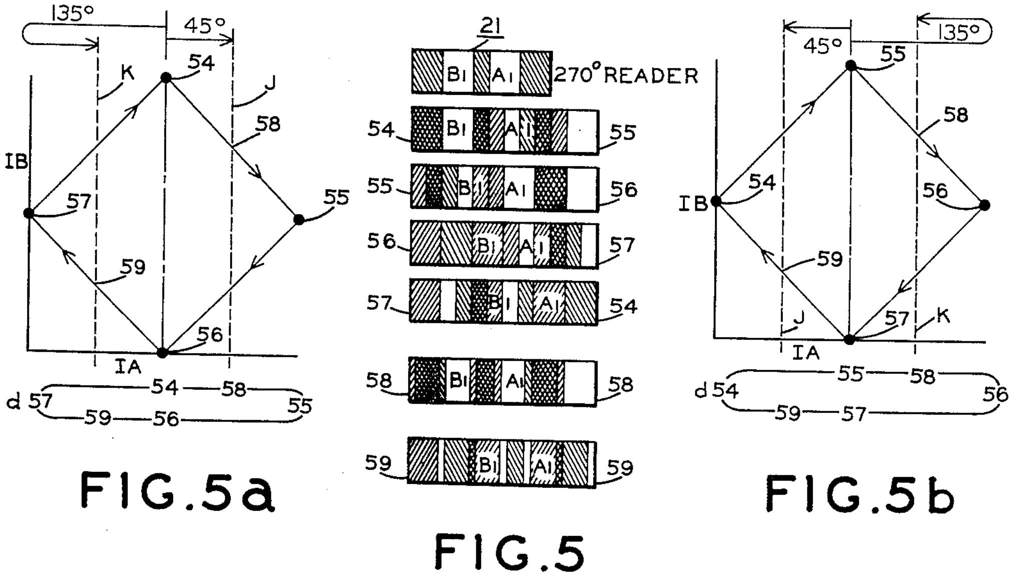

Figure 5 represents diagrammatically the light patterns directed to two photo-cells A1 and B1 each coincident with transparent areas to one side of a center line of the least significant column of a 270° reader according to this invention, reading the least significant column of a natural binary scale such as shown in Figure 1.

Figure 5*a* shows the phase relationship of light intensities IA and IB directed respectively to the two photo-cells A1 and B1 each coincident with the transparent areas to each side of the center line of the 270° reader of Figure 5 plotted against distance *d*.

Figure 5*b* shows the phase relationship of light intensities IA and IB directed respectively to the two photo-cells A1 and B1 each coincident with the transparent areas to each side of the center line of a reader which is a mirror image of the 270° reader of Figure 5 plotted against distance *d*, the relationship being 180° out of phase with respect to that in Figure 5*a*.

Figures 6, 6A, 6B:
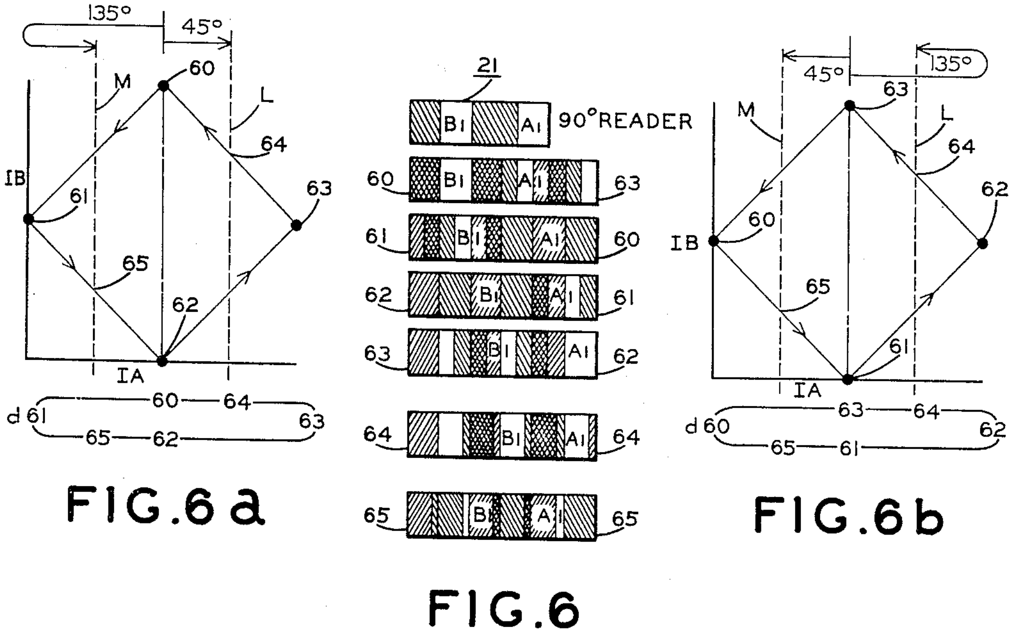

Figure 6 represents diagrammatically the light patterns directed to two photo-cells A1 and B1 each coincident with transparent areas to one side of a center line of the least significant column of a 90° reader according to this invention, reading the least significant column of a natural binary scale such as shown in Figure 1.

Fig. 6*a* shows the phase relationship of light intensities IA and IB directed respectively to the two photo-cells A1 and B1 each coincident with the transparent areas to each side of the center line of the 90° reader of Figure 6 plotted against distance *d*.

Figure 6*b* shows the phase relationship of light intensities IA and IB directed respectively to the two photo-cells A1 and B1 each coincident with the transparent areas to each side of the center line of a reader which is a mirror image of the 90° reader of Figure 6, plotted against distance *d*, the relationship being 180° out of phase with respect to that in Figure 6*a*.

Figure 7 represents diagrammatically the light patterns directed to two photo-cells A1 and B1 each coincident with transparent areas to one side of a center line of the least significant column of a 225° reader according to this invention, reading the least significant column of a natural binary scale such as shown in Figure 1.

Figure 7*a* shows the phase relationship of light intensities IA and IB directed respectively to two photo-cells A1 and B1 each coincident with the transparent areas to one side of the center line of the 225° reader of Figure 7, plotted against distance *d*.

Figure 7*b* shows the phase relationship of light intensities IA and IB directed respectively to the two photo-cells A1 and B1 each coincident with the transparent areas to one side of the center line of a reader which is a mirror image of the 225° reader of Figure 7 plotted against distance *d*, the relationship being 180° out of phase with respect to that in Figure 7*a*.

Figure 8 represents diagrammatically the signals directed to two photo-cells A1 and B1 each coincident with transparent areas to one side of a center line of the least significant column of a 315° reader according to this invention, reading the least significant column of a natural binary scale such as shown in Figure 1.

Figure 8*a* shows the phase relationship of light intensities IA and IB directed respectively to the two photo-cells A1 and B1 each coincident with the transparent areas to one side of the center line of the 315° reader of Figure 8, plotted against distance *d*.

Figure 8*b* shows the phase relationship of light intensities IA and IB directed respectively to the two photo-cells A1 and B1 each coincident with the transparent areas to one side of the center line of a reader which is a mirror image of the 315° reader of Figure 8 plotted against distance *d*, the relationship being 180° out of phase with respect to that in Figure 8*a*.

Figure 9:
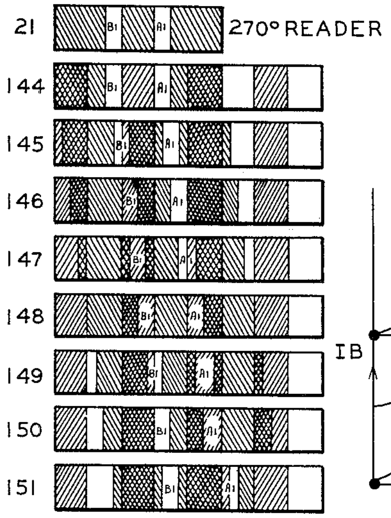

Figure 9 represents diagrammatically the signals directed to two photo-cells A1 and B1 each coincident with transparent areas to one side of a center line of the least significant column of a 270° reader according to this invention, the transparent areas of the least significant column thereof having a dimension measured along the column less than the dimension measured along the column of the transparent areas of the underlying scale, reading the least significant column of a natural binary scale such as shown in Figure 1.

Figure 9A:
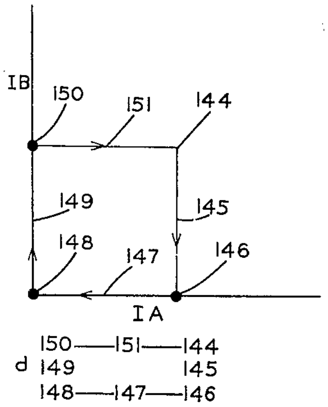

Figure 9*a* shows the phase relationship of light intensities IA and IB directed respectively to the two photo-cells A1 and B1 each coincident with the transparent areas to one side of the center line of the 270° reader of Figure 9, plotted against distance *d*.

Figure 9B:
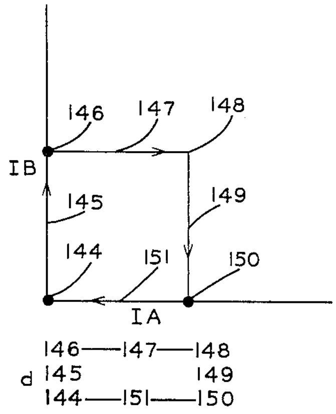

Figure 9*b* shows the phase relationship of light intensities IA and IB directed respectively to the two photo-cells A1 and B1 each coincident with the transparent areas to one side of the center line of a reader which is a mirror image of the 270° reader of Figure 9 plotted against distance *d*, the relationship being 180° out of phase with respect to that in Figure 9*a*.

Figure 10:
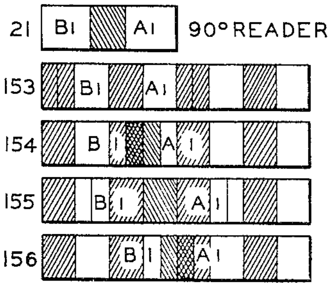

Figure 10 represents diagrammatically the signals directed to two photo-cells A1 and B1 each coincident with transparent areas to one side of a center line of the least significant column of a 90° reader according to this invention, the transparent areas of the least significant column thereof having a dimension measured along the column of the transparent areas of the underlying scale and occurring in the same cyclic repetition, reading the least significant column of a natural binary scale such as shown in Figure 1.

Figure 10A:
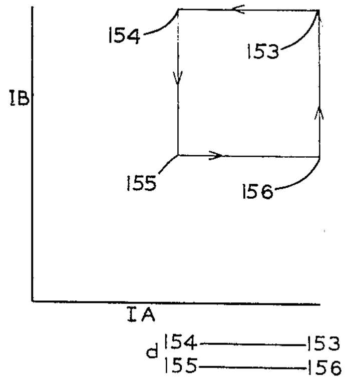

Figure 10*a* shows the phase relationship of light intensities IA and IB directed respectively to two photo-cells A1 and B1 each coincident with the transparent areas to one side of the center line of the 90° reader of Figure 10, plotted against distance *d*.

Figure 10B:
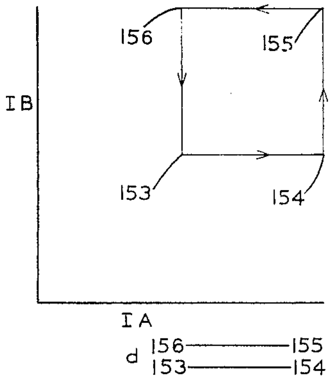

Figure 10*b* shows the phase relationship of light intensities IA and IB directed respectively to two photo-cells A1 and B1 each coincident with the transparent areas to one side of the center line of a reader which is a mirror image of the 90° reader of Figure 10 plotted against distance *d*, the relationship being 180° out of phase with respect to that in Figure 10*a*.

Figure 11:
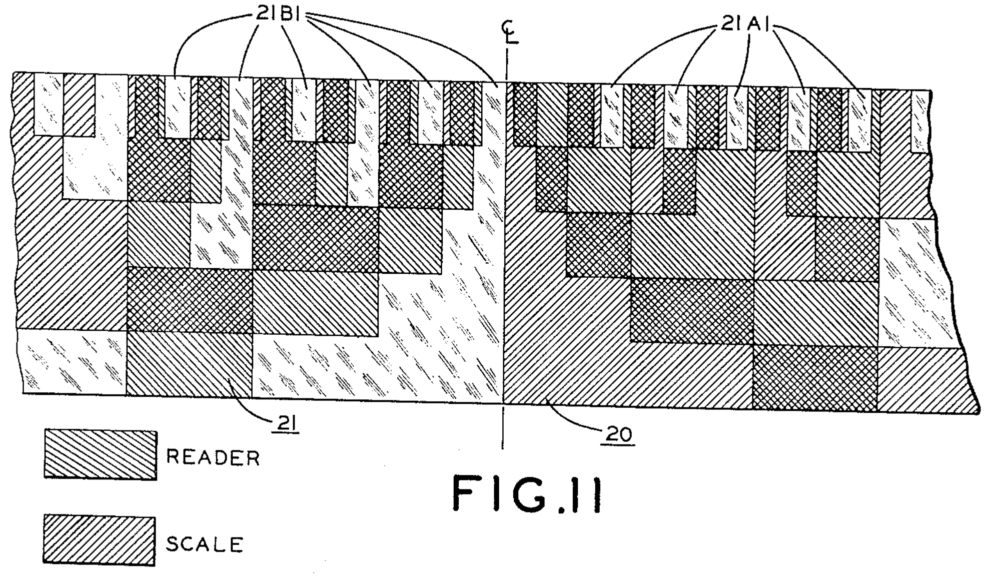

Figure 11 shows a portion of the binary scale of Figure 1 with the reader of Figure 2 in the decimal digit 0 position on the scale.

Figure 12:
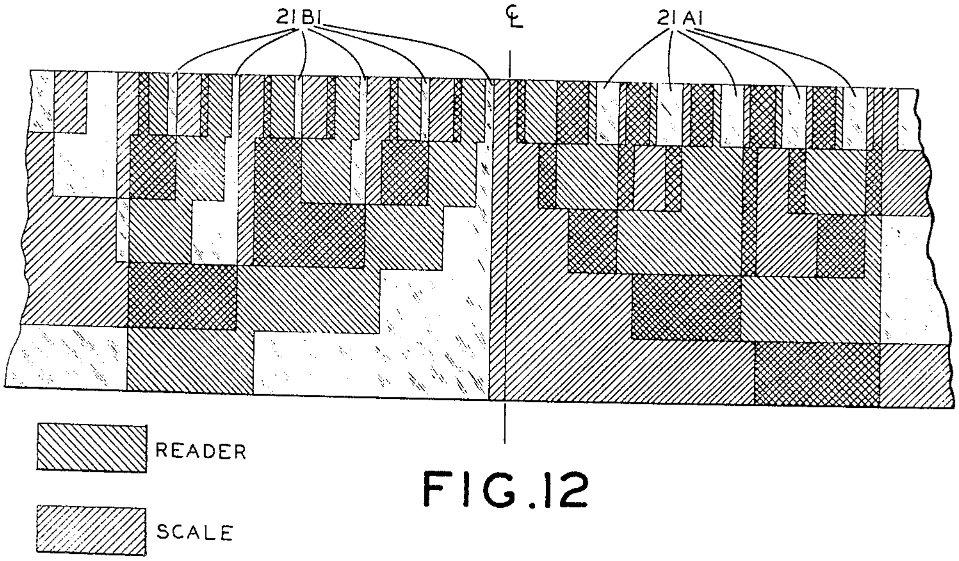

Figure 12 shows a portion of the binary scale of Figure 1 with the reader of Figure 2 half way between the decimal digit 0 position and the decimal digit 1 position.

Figure 13:
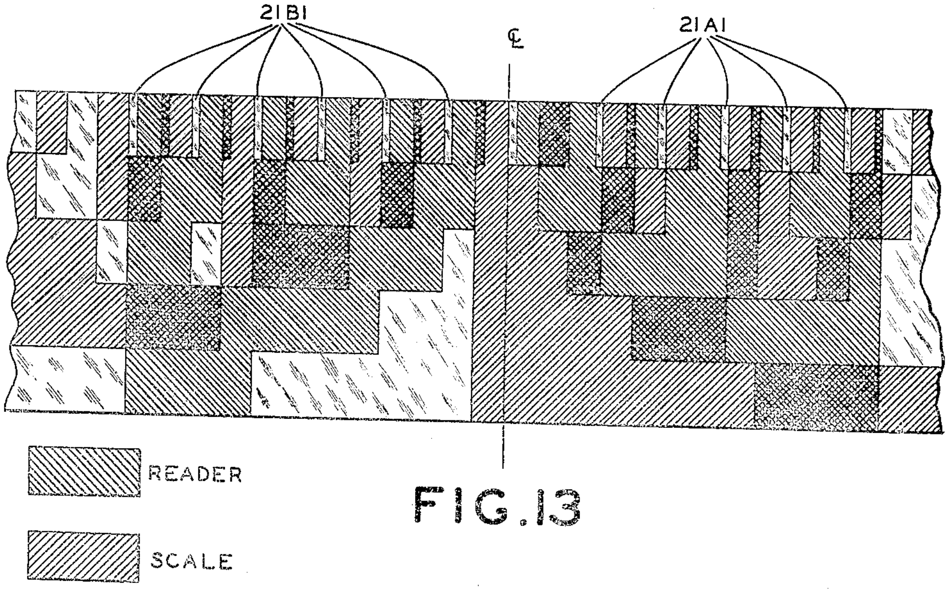

Figure 13 shows a portion of the binary scale of Figure 1 with the reader of Figure 2 in the decimal digit 1 position.

Figure 14:
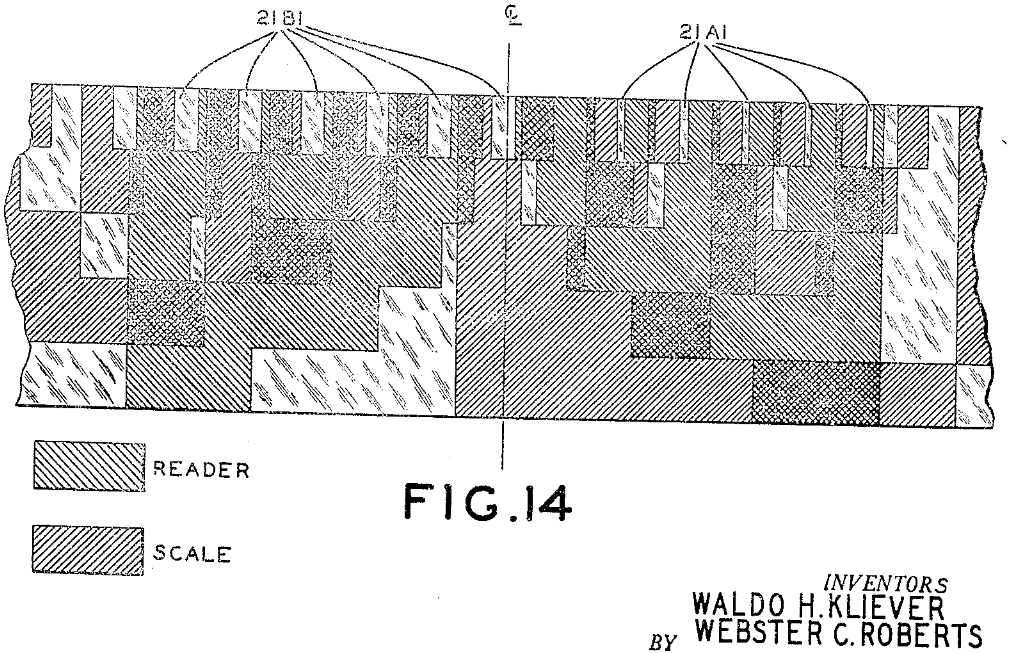

Figure 14 shows a portion of the binary scale of Figure 1 with the reader of Figure 2 half-way between the decimal digit 1 position and the decimal digit 2 position.

Figure 15:
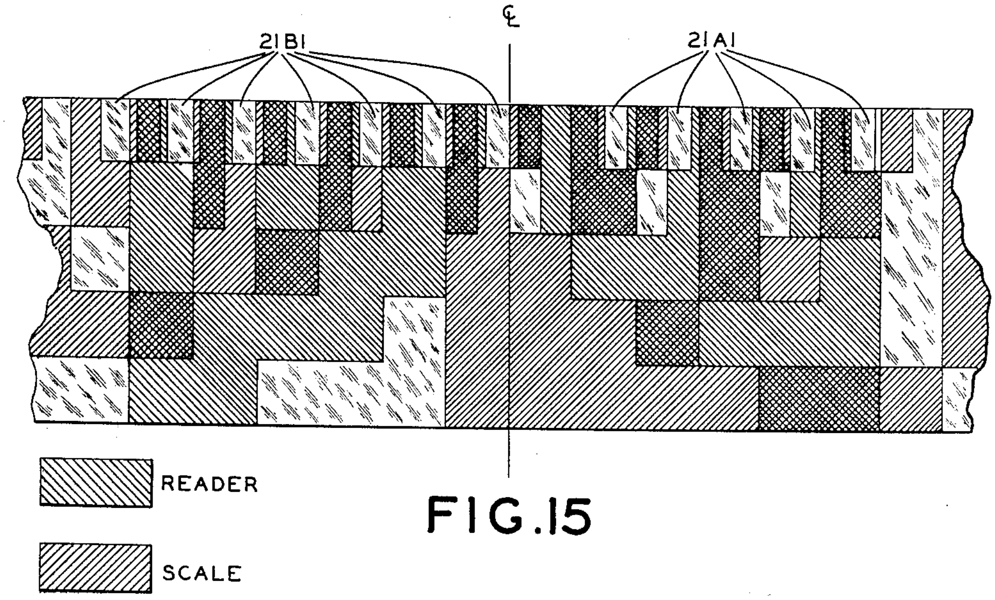

Figure 15 shows a portion of the binary scale of Figure 1 with the reader of Figure 2 in the decimal digit 2 position.

Figure 16:
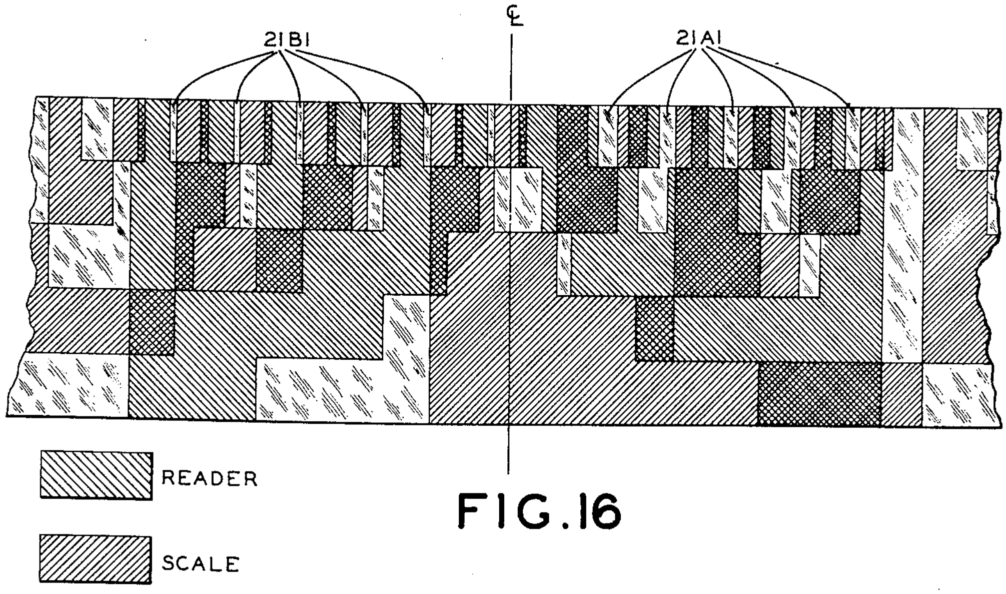

Figure 16 shows a portion of the binary scale of Figure 1 with the reader of Figure 2 half way between the decimal digit 2 position and the decimal digit 3 position.

Figures 17, 22, 23:
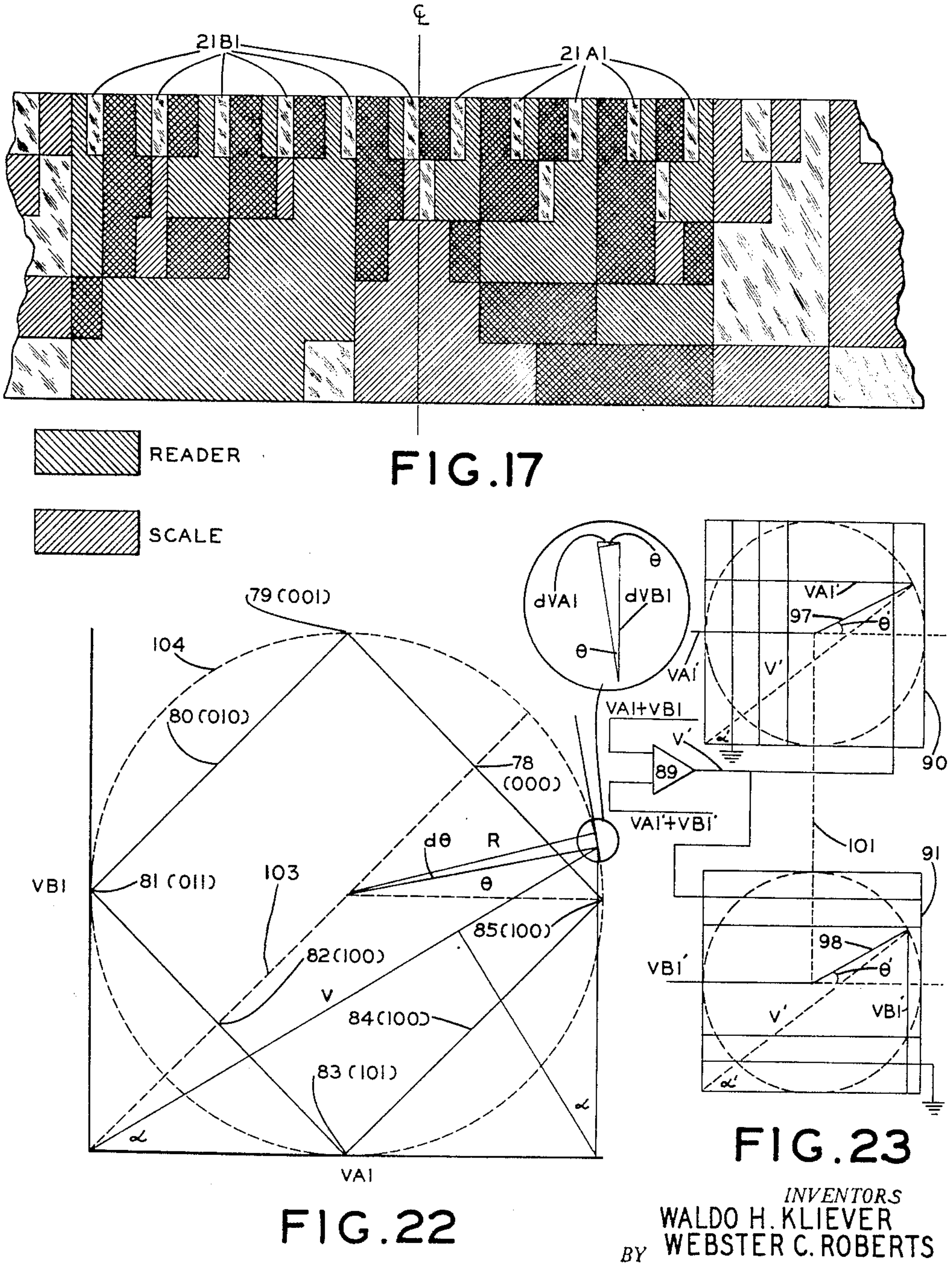

Figure 17 shows a portion of the binary scale of Figure 1 with the reader of Figure 2, with the least significant column modified according to Figure 9 and the dimension of the transparent areas in columns more significant than the least significant column modified to be less than the dimension, measured along the column, of the transparent areas of the reader of Figure 2, while occurring in the same cyclic repetition, reading the decimal 2 position.

Figure 18:
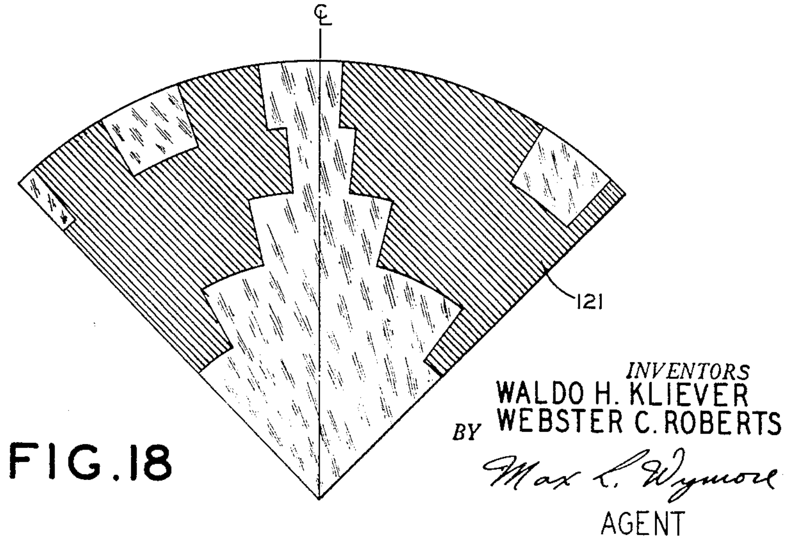

Figure 18 shows another embodiment of the reader according to the invention.

Figure 19:
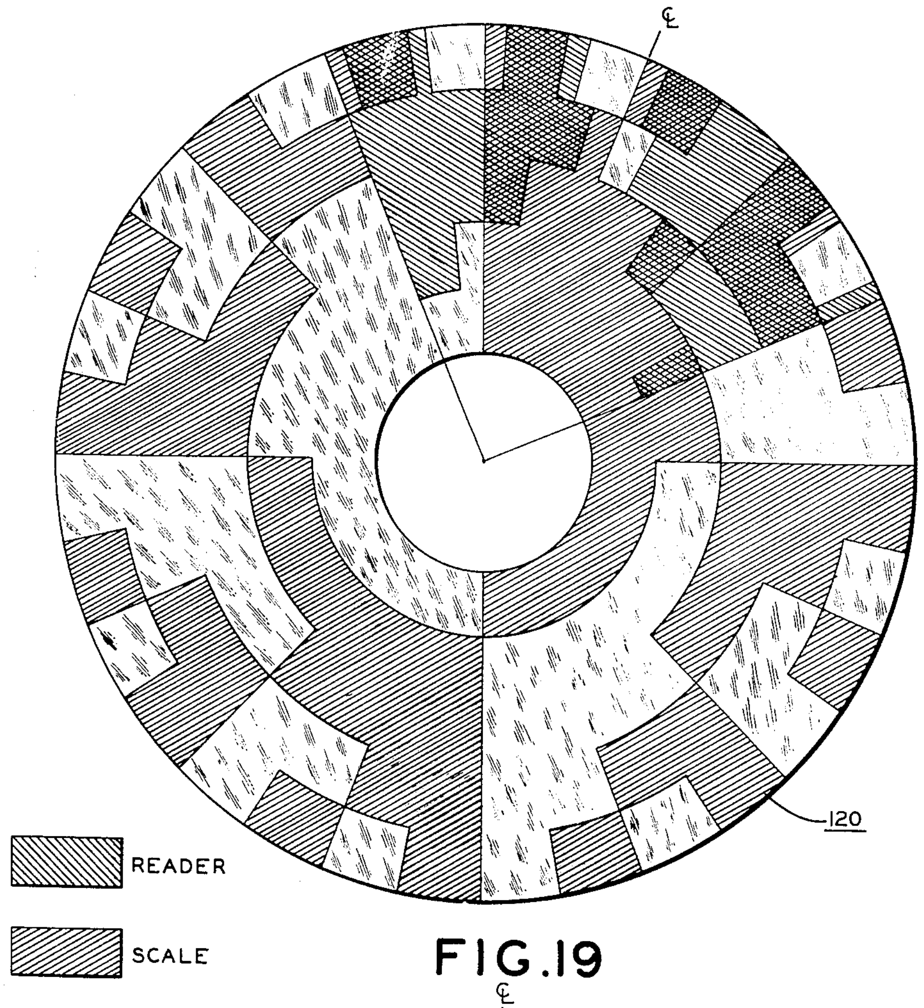

Figure 19 shows a portion of a natural binary scale of circular configuration, with the reader of Figure 18 in the decimal 2 position.

Figure 20:
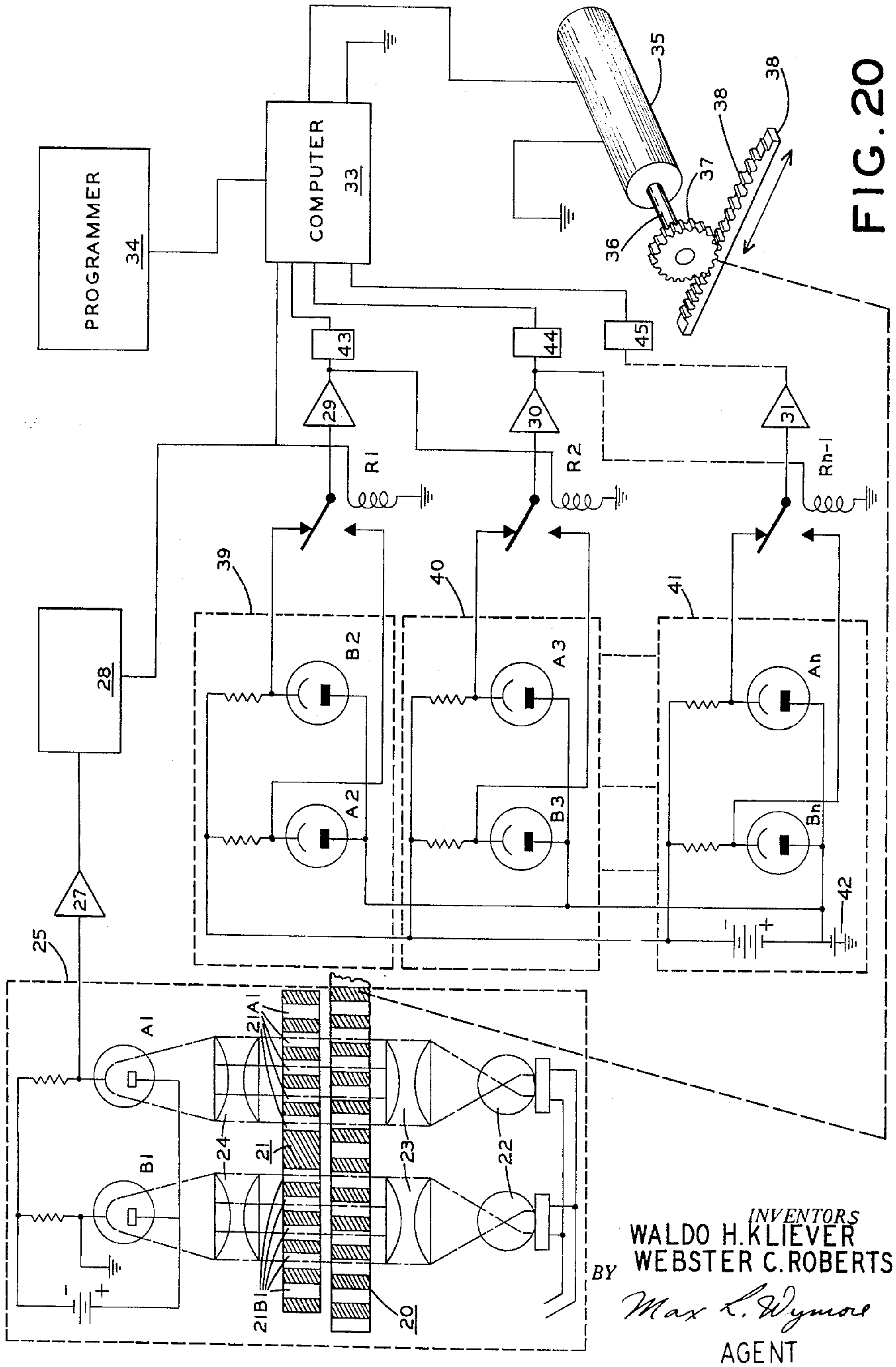

Figure 20 shows a block diagram of a circuit for reading the signals generated by the reader of this invention in conjunction with a natural binary scale.

Figure 21:
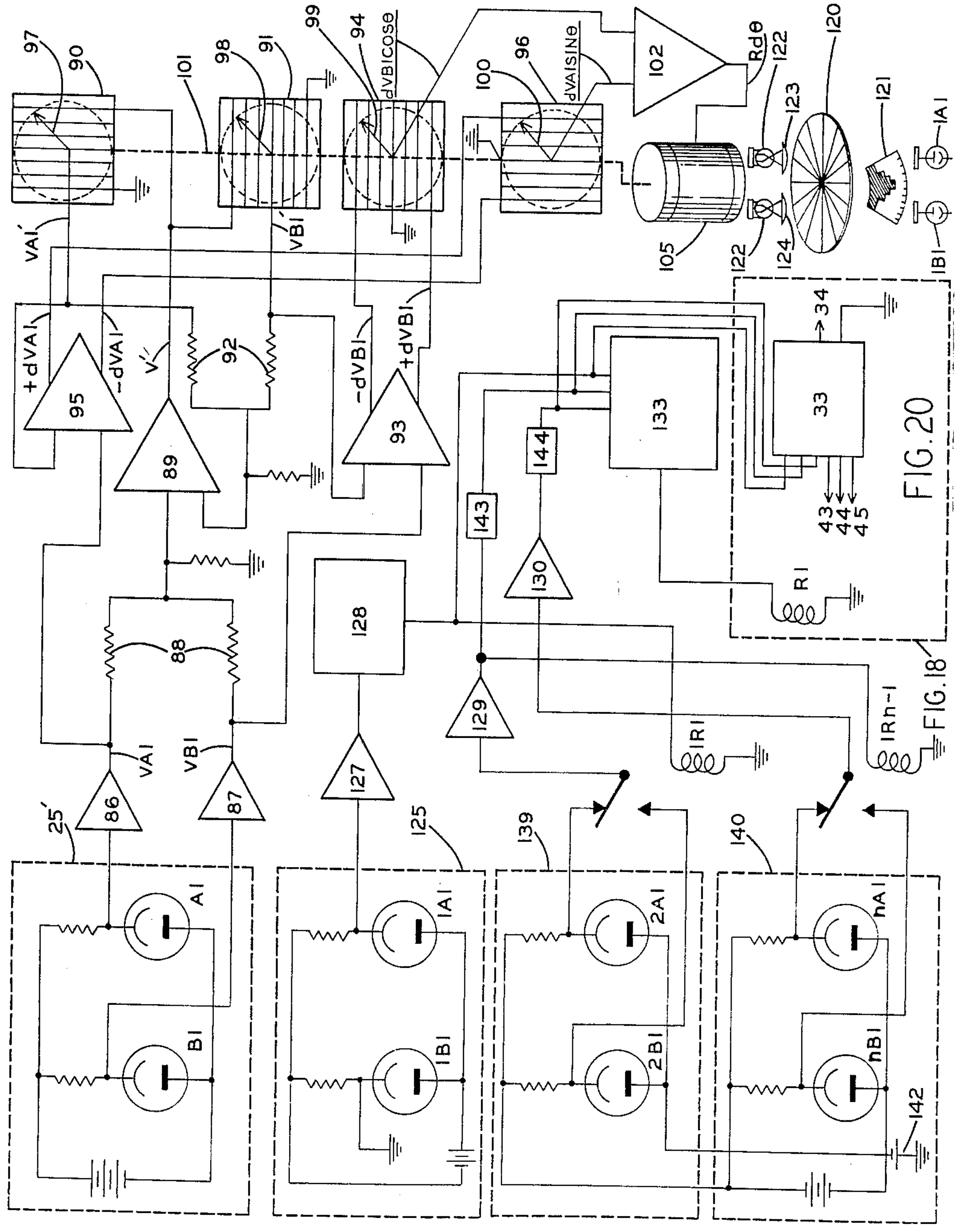

Figure 21 shows a block diagram of a circuit for reading the signals generated by the reader of this invention in conjunction with a natural binary scale with circuits which provide for interpolating divisions in the least significant column of the scale.

Figure 22 is a graphical representation of the phase relationship of voltages developed by photo-cells A1 and B1 as a result of light directed thereto as shown in Figure 5*a*. Figure 22 is used to explain the theory by which the circuitry of Figure 21 converts these voltages to a signal representative of the rotational position of a shaft.

Figure 23 illustrates the relationship between the resolver potentiometers and the graphical representation of voltages contained in Figure 22.

In contrast to a progressive scale and reader, scale readers according to the present invention use natural binary scales and are provided with two reading areas (hereinafter designated as "A" and "B") one slightly advanced from the normal position of the slot in a conventional reader and the other similarly retarded as best appears in Figure 11. The reading program for readers in accordance with the present invention is sequential from the so-called least significant (but actually most important) column 20–1 through more significant columns 20–2, 20–3, 20–4 and 20–5, Figure 1. The least significant column readings serve to select the appropriate reader for the successively higher-order digits by determining whether the A or B opening of the next column in sequence shall be read. This assures that all digits have correct values at the time of reading, even when the reading is very near a position where several digits need to change. Readers in accordance with this invention may conveniently be constructed in either linear form (Figure 2) or circular form (Figure 18).

Figure 2 shows an enlarged representation of one embodiment of readers according to the present invention. In each column thereof there are two sets of windows or transparent reading areas designated as A and B areas, i.e., 21A1, 21B1, 21A2, 21B2, 21A3, 21B3 and so forth. These windows have opaque and transparent areas like those of the corresponding scale, Figure 1, but are phased differently. In use there are two lamps, 22, or two photo cells A1 and B1, Figure 20, per column (one for the A side, and one for the B side). Either the cells or the lamps can be switched to obtain the desired reading. The described method is directed to switching the photo cells.

Variations in light intensity passing through areas A and B occurs as scale 20 moves past reader 21 as shown in Figures 11–15. A switching circuit, Figure 20, interprets the light intensities of selected areas as binary numbers, instantaneously representing the position of the scale. The achieve this result, the sections of scale 20 in each reader window A, B, must be properly phased. Because it is easier and more accurate to compare measurements than it is to determine absolute values, the cross-over point for digits on the least significant column is established at the point where the readings of A1 and B1 are equal. Also, windows 21A1 and 21B1 are 90 (270) degrees out of phase, Figures 5 and 6. Contrast would be improved if they were 180 (0) degrees out of phase, Figures 3 and 4; however, with the 90 (270) degree phasing it is possible to interpolate to gain higher resolution than the distance between the least significant column lines, as will be discussed in greater detail further in the description.

The phasing for the columns more significant than the least significant column is chosen to provide good contrast at the points where the reading of least significant column calls for switching the reading of windows or areas, 21A2 to 21B2 or 21B2 to 21A2, in the next more significant column. The phasing of all zones will be better understood by referring to Figure 11. In this figure the center line ℄ is the center line for the reader columns more significant than the least significant column and is positioned on the natural binary scale 20 at the digital 0,0,0,0,0 position. In this position, the reader is just as the change from digital 1,1,1,1,1 to 0,0,0,0,0 position. Note that 21B1 is 45 degrees to the negative or left and 21A1 is 360 degrees plus 225 degrees to the positive side or right, making them 90 degrees (same as 270 degrees) apart.

Windows or transparent reader areas of columns more significant than the least significant column are 45 degrees of the particular scale 20 to the right and left of the center line respectively. This, plus the fact that windows or transparent areas or reader 21 for all columns more significant than the least significant column are one-half the width of the corresponding areas of scale 20 result in a constant level high intensity light or a constant level low intensity light passing, so that the readings on these columns are always all digital 1 or digital 0, and no readings with intermediate values need be identified. The reader areas may conveniently be less than one-half width, but the one-half width is preferred due to greater light transmission.

Because of the 90 degree position of the two reader areas 21A1 and 21B1, their intensities yield alternate high-level and low-level points of equality, numerals 64 and 65 of Figure 6. The high-level points of equality are selected as the "significant" cross-over points, calling for a change of digits in the 21–2 column.

The logic for the 21–1 column calls for two simple laws: (1) If 21A1 is brighter than 21B1, read this column as binary 0, and if 21B1 is brighter than 21A1, read this column as binary 1. (2) If column 21–1 reads binary 1, switch column 21–2 to read 21B2, and if column 21–1 reads binary 0, switch column 21–2 to read 21A2. Following the above logic, the 21–2 column has cross-overs at the same scale position as the 21–2 column. All the higher-order columns have cross-overs not coincident with those of the next lower order.

While the selection of 21A2 or 21B2 of column 21–2 depends on whether 21A1 or 21B1 is brighter, the selection of 21A3 or 21B3 does not depend on whether 21A2 or 21B2 was read, but only on whether the reading was bright or dark. In other words, it depends on whether the previous reading was a binary 1 or 0. Rule 2 above applies, and the logic for the entire scale and reader of this invention can now be stated:

(1) For column 21–1 (least significant):
   *a*. If 21A1 is brighter than 21B1, read binary 0, and
   *b*. If 21B1 is brighter than 21A1, read binary 1.
(2) For any other column:
   *a*. Read 21A if the reading of the column of next lower order is binary 0, and,
   *b*. Read 21B if the reading of the column of next lower order is binary 1.
(3) For the selected area of any column more significant than the least significant:
   *a*. If the light intensity is bright, read binary 1, and,
   *b*. If the light intensity is dark, read binary 0.

It will be readily appreciated that the logic will be just the reverse if when 21A1 is brighter than 21B1, it is read as a binary 1, and when 21B1 is brighter than 21A1, it is read as a binary 0.

The table which follows illustrates the logic in tabular form for movement of scale reader 21 from the decimal digit 0 position (binary reading 0,0,0,0,0), Figure 11, to the right relative to scale 20 to decimal digit position 8 (binary reading 0,1,0,0,0), decimal digit position 0 represented by Figures 11 and 12; decimal digit position 1 represented by Figures 13 and 14; and decimal digit position 2 represented by Figures 15 and 16.

| Decimal Digit | Column 21-1 | | Column 21-2 | | Column 21-3 | | Column 21-4 | | Column 21-5 | | Binary Reading |
|---|---|---|---|---|---|---|---|---|---|---|---|
| | Brightest Window | Read | Switch To | Read | Switch To | Read | Switch To | Read | Switch To | Read | |
| 0 | 21A1 | 0 | 21A2 | 0 | 21A3 | 0 | 21A4 | 0 | 21A5 | 0 | 0,0,0,0,0 |
| 1 | 21B1 | 1 | 21B2 | 0 | 21A3 | 0 | 21A4 | 0 | 21A5 | 0 | 0,0,0,0,1 |
| 2 | 21A1 | 0 | 21A2 | 1 | 21B3 | 0 | 21A4 | 0 | 21A5 | 0 | 0,0,0,1,0 |
| 3 | 21B1 | 1 | 21B2 | 1 | 21B3 | 0 | 21A4 | 0 | 21A5 | 0 | 0,0,0,1,1 |
| 4 | 21A1 | 0 | 21A2 | 0 | 21A3 | 1 | 21B4 | 0 | 21A5 | 0 | 0,0,1,0,0 |
| 5 | 21B1 | 1 | 21B2 | 0 | 21A3 | 1 | 21B4 | 0 | 21A5 | 0 | 0 0,1,0,1 |
| 6 | 21A1 | 0 | 21A2 | 1 | 21B3 | 1 | 21B4 | 0 | 21A5 | 0 | 0,0,1,1,0 |
| 7 | 21B1 | 1 | 21B2 | 1 | 21B3 | 1 | 21B4 | 0 | 21A5 | 0 | 0,0,1,1,1 |
| 8 | 21A1 | 0 | 21A2 | 0 | 21A3 | 0 | 21A4 | 1 | 21B5 | 0 | 0,1,0,0,0 |

As noted previously, the intensities are theoretically such that on all columns except the least significant column, the readings are either a binary 1 or a binary 0 and it is not necessary to distinguish partial values. In practice with the finest division of the scale (least significant column) being 0.0005 inch, a two-inch spacing between scale 20 and reader 21 and moderately parallel light beams, the lowest light intensity of a binary 1 reading is five times the highest intensity of a binary 0 reading. This, together with the large windows or reading areas in the more significant columns makes reading highly independent of skew between scale and reader. Accuracy of measurement depends on the fine or least significant column and the more significant columns are essentially counters, permitting relatively large mechanical and electrical tolerances in the system without sacrifice of accuracy.

The general principles of operation will be more clearly understood by reference to Figure 20 which shows a simplified circuit for transmitting to a receiver, such as computer 33, digital data in the form of binary numbers or "words" representing the position of a movable element, such as the tool holder of a lath, with respect to a fixed part of the machine, such as the lath bed. A natural binary scale 20, Figure 1, the least significant column, of which, 20–1 is shown in section in Figure 20 is attached to the fixed part of the machine. Positioned adjacent scale 20 and contiguous therewith, is a reader 21, Figure 2, mounted on element 38 for relative movement with the fixed part of the machine. The least significant column of reader 21 is shown in section in Figure 20 as having transparent areas 21A1 and 21B1. A light source 22 is positioned to transmit light through each group of reader areas 21A1 and 21B. Optical systems 23 and 24 serve respectively to collect light from source 22 and direct light passing through areas 21A1 and 21B1 to photocells A1 and B1 in a well known manner. Cells A1 and B1 are arranged in a conventional bridge circuit 25 such that when equal amounts of light fall on each cell the output from the bridge is zero. If the light falling on cell A1 is greater than that falling on cell B1, the bridge output is positive, and if the light falling on cell B1 is greater than that falling on cell A1, the bridge output is negative. The output from the bridge 25 is connected to the input of amplifier 27. Amplifier 27 is so designed that when the light falling on cells A1 and B1 is balanced and the output from the bridge is zero, the output from amplifier 27 is zero and when the output from bridge 25 is negative or positive, the output from amplifier 27 is a negative or positive value respectively.

It is to be understood that the term "zero output" as used herein is intended to mean the dark or unilluminated output of cells A1 and B1 which would not actually be zero but rather a very low value in comparison to the light or illuminated output of the cells.

The output of amplifier 27 is connected to the input of flip-flop 28. When the output from amplifier 27 is positive, flip-flop 28 is designed to produce an output sufficient to operate relay R1 and the presence of a signal from flip-flop 28 is defined as a binary "0" in the least significant column 20–1 of scale 20, as read by cells A1 and B1 of bridge 25. When the output from amplifier 27 is negative, the output from flip-flop 28 is zero and the absence of a signal from flip-flop 28 is defined as a binary "1" in the least significant column. When the output from amplifier 27 is zero, the flip-flop 28 will not be energized and the output therefrom continues to be the same as the previous reading.

Cells A2, B2, A3, B3 . . . A*n*, B*n* are positioned to read respectively transparent areas 21A2, 21B2, 21A3, 21B3 . . . 21A*n*, 21B*n* in each more significant column of the scale 20, Figure 1. A switching means, such as relay R1, is provided and arranged such that whichever cell A1 or B1 is brighter, the opposite cell B2 or A2 is read. For example, if cell A1 is brighter, cell B2 is read. Here, again the state of B2, determines whether cell A3 or B3 is read. Relay R2 is provided and arranged such that if cell B2 is light cell B3 is read or if cell B2 is dark, cell A3 is read. In subsequent columns, if the cell read in the previous column is dark, the A cell is read; if the cell in the previous column is bright, the B cell is read.

When a signal is derived from flip-flop 28, indicating cell A1 is or has been read as brightest, this signal energizes relay R1 and cell B2 is read in column 20–2 of scale 20. If cell B2 is dark, there is a zero output therefrom and the output of amplifier 29 and flip-flop 43 is zero, representing in this and subsequent columns a binary "0." In this case relay R2 is not energized and the reading in column 20–3 of scale 20 is taken on the A3 cell. If in the above instance cell B2 is light, a signal is developed thereby which is amplified by amplifier 29 and applied to flip-flop 43 which develops an output, representing a binary "1." Also in this instance the output from amplifier 29 energizes relay R2 and the reading in column 20–3 of scale 20 is taken on the cell B3. This same reading procedure is followed for all subsequent column reading.

The signal or zero-signal, as the case may be, from each flip-flop 28, 43, 44, 45, etc. may be fed to a computer 33 for conversion to analog data and/or for comparison with information in binary form from a programmer 34, which may be a punched tape reader, magnetic tape reader or any other well known binary information generator. Any error existing between the signal from programmer 34 and flip-flop 28, 43, 44, 45, etc., produces an analog output from computer 33 equivalent to such error. This ouptput is applied to a servomotor 35, producing rotation of shaft 36 and attached gear 37, to cause meshing rack 38 and attached scale 20 to move in a direction to minimize the error between the information from the programmer 34 and the output of the flip-flop indicating the position of rack 38 and scale 20.

The least significant column of a natural binary scale when read with the least significant column of the improved reader of this invention provides a positive means of determining whether the reader is between the decimal digit 0 and the decimal digit 1 position or between the decimal digit 1 and decimal digit 2 position or any two like positions along the scale as will be more fully explained as this description proceeds. The least significant column reading further identifies which cell or which side of the reader is to be read in the next more significant column of the scale. In practice the least significant column of the reader may assume various patterns with respect to the more significant columns of the reader.

Reference is made to Figure 3 which shows the least significant column of a reader with transparent areas 21A1 and 21B1 with their edges contiguous and being 180° out of phase, each with the other. Reference numerals 46—49 designate patterns representing those developed by transparent areas 21A1 and 21B1 in traversing one complete cycle of the underlying least significant column 20–1 of scale 20. One cycle or 360° is defined as the distance required to traverse one complete transparent area and one complete opaque area in the least significant column of scale 20. Figure 3*a* illustrates the phase relationship of light intensities IA and IB from light source 22 directed to photo-cell A1 and B1 coincident with transparent areas 21A1 and 21B1 as shown by patterns 46—49, plotted against distance *d*. It will be seen that if the pattern designated by numeral 46 were to represent the decimal digit 0 position and pattern 48 were to represent decimal digit 1 position, in moving to pattern 47 from the decimal digit 0 position, transparent areas 21B1 will direct more light to cell B1 than transparent areas 21A1 and in going from pattern 47 to pattern 48, the decimal digit 1 position, transparent areas 21A1 will direct more light to cell A1 than transparent areas 21B1 will direct to cell B1. By shifting the reader 90° or a distance equal one-half the width of a transparent area of the least significant column of the scale with respect to the decimal digit 0 position of column 20–1 of scale 20, the pattern at decimal digit 0 would appear as either 47 or 49 depending on the direction of the shift. Thus, in moving from decimal digit 0 position to decimal digit 1 position, the light directed to one cell would be greater than the light directed to the other cell.

Reference is made to Figure 4 which shows the least significant column of a reader with transparent areas 21A1 and 21B1 spaced apart a distance equal to their width and 0° or 360° out of phase, each with the other. Reference numerals 50—53 designate the patterns formed as transparent areas 21A1 and 21B1 traverse one complete cycle of the underlying least significant column 20–1 of scale 20. Figure 4*a* illustrates the phase relationship of light intensities IA and IB from light source 22 directed to photo-cells A1 and B1 coincident with transparent areas 21A1 and 21B1 as shown by patterns 50—53, plotted against distance *d*. It is evident from Figure 4*a* that with a 0° or 360° phase relationship between transparent areas 21A1 and 21B1 of the least significant reader column the light directed to either cell A1 or B1 will be equal. With a phase relationship of 0° or 360°, the position of the least significant column of the reader with respect to the scale is less readily identifiable within a cycle or a portion of a cycle, however, such a reader may be used to advantage where the least significant column is used to index the reading of subsequent columns.

Figure 5 shows the least significant column or a reader with transparent areas 21A1 and 21B1 displaced with respect to each other a distance equal to one and one-half times the width of apertures of the corresponding column of the scale, thus being 270° out-of-phase with each other. Reference numerals 54—57 designate the patterns formed as transparent areas 21A1 and 21B1 of the reader traverse one complete cycle or 360° of the underlying least significant column 20–1 of scale 20. Figure 5*a* illustrates the phase relationship of light intensities IA and IB from a light source 22 directed to photo-cells A1 and B1 coincident with transparent areas 21A1 and 21B1 as shown by patterns 54—57 plotted against distance *d*. In traversing from pattern 54 to pattern 55, an intermediate position of maximum balance, shown by pattern 58, is encountered. Also in traversing from pattern 56 to pattern 57, an intermediate position of minimum balance, shown by pattern 59, is encountered. Thus by shifting the reader to the right 45° or a distance along the column equal to one fourth the width of a transparent area with respect to the decimal digit 0 position of column 20–1 of the scale 20, as shown by dotted line J in Figure 5*a*, the pattern at decimal digit 0 position of scale 20 would appear as at 58 and a shift of the reader 135° to the left or a distance along the column equal to three-fourths of the width of a transparent area with respect to the decimal digit 0 position of column 20–1 of scale 20, as shown by dotted line K in Figure 5*a* the pattern at decimal digit 0 position of scale 20 would appear as at 59. With the pattern 58 representing decimal digit 0 position the light directed from a light source 22 to photo-cells A1 and B1 coincident with transparent areas 21A1 and 21B1 would be balanced at a maximum value. The pattern 59 would then appear at decimal digit 1 position of scale 20. As the reader traverses from decimal digit 0 position to decimal 1 position, the light directed to cell A1 will be greater than that directed to cell B1. At decimal digit 1 position the light directed to cells A1 and B1 will again be equal but at a minimum value as shown by pattern 59. As the reader traverses from decimal digit 1 position to decimal digit 2 position (pattern 58) the light directed to cell B1 will be greater than that directed to cell A1. With a shift of the reader of 135°, or the complement of 45°, to the left as shown by dotted line K on Figure 5*a*, the pattern at decimal digit 0 position of scale 20 is as shown by 59 and the pattern at decimal digit 1 position is as shown by 58.

With the 270° reader of Figure 5 shifted 45° to the right, thus assuring the decimal digit 0 position relative to scale 20, the pattern is that shown at 58 or a maximum balance. This may be read as a binary "0" and may continue to be read as a binary "0" until the minimum balance pattern 59 is achieved at decimal digit 1 position which may be read as a binary "1." In traversing the reader between decimal digit 0 position and decimal digit 1 position, the light directed to cell A1 will be greater than that directed to cell B1 and as indicated above may be read as a binary "0." Likewise in traversing the reader between decimal digit 1 position and decimal digit 2 position (pattern 58), the light directed to cell B1 will be greater than that directed to cell A1 and may be read as a binary "1." Since there is a unique relationship existing between the light directed to each of the cells A1 and B1 in traversing the reader from decimal digit 0 position to decimal digit 1 position and from decimal digit 1 position to decimal digit 2 position, etc., this provides a condition for interpolating between each of these positions as will be more fully explained hereinafter.

Reference is made to Figure 5*b* which illustrates the phase relationship of light intensities IA and IB from light source 22 directed to light sensitive devices A1 and B1, plotted against distance *d*, by a reader which is a mirror image of the reader of Figure 5. The same logic applies as explained for Figure 5*a* but with the light patterns shifted 90° or one-fourth cycle.

Figure 6 illustrates the least significant column of a reader with transparent areas 21A1 and 21B1 displaced with respect to each other a distance equal to 2½ times their width along the column, thus being 360°–90° or effectively 90° out-of-phase with each other. Reference numerals 60—63 designate the patterns formed by transparent areas 21A1 and 21B1 in traversing the reader one complete cycle or 360° of the underlying least significant column 20–1 of scale 20. Figure 6*a* illustrates the phase relationship of light intensities IA and IB from a light source 22 directed respectively to photo-cells A1 and B1 coincident with transparent areas 21A1 and 21B1 as shown by patterns 60—63 plotted against distance *d*. In traversing from pattern 63 to pattern 60, an intermediate position of maximum balance shown by pattern 64, is encountered. Also in traversing from pattern 61 to pattern 62, a position of minimum balance shown by pattern 64, is encountered. Thus by shifting the reader areas 45° to the right, or a distance along the column equal to one-fourth the width of a transparent area of the scale, with respect to the decimal digit 0 position of column 20–1 of scale 20, as shown by dotted line L in Figure 6*a*, the pattern at decimal digit 0 position of scale 20 would appear as at 64 or if a shift is made of the reader areas to the left 135° or a distance along the column equal to three-fourths the width of a transparent area of the scale with respect to the decimal digit 0 position of column 20–1 of scale 20, as shown by dotted line M in Figure 6*a*, the pattern at decimal digit 0 position of scale 20 would then appear as at 65.

With a shift of the reader areas 45° to the right, the decimal digit 0 pattern would appear as at 64. In this position the light directed from a light source 22 to cells A1 and B1 coincident with transparent areas 21A1 and 21B1 would be balanced at a maximum value. The pattern 65 would then appear at decimal digit 1 position of scale 20. As the reader traverses from decimal digit 0 position to decimal digit 1 position, the light directed to cell A1 will be greater than that directed to cell B1. At decimal digit 1 position, the light directed to cells A1 and B1 will again be equal but at a minimum value as shown by pattern 65. As the reader traverses from decimal digit 1 position to decimal 2 position (pattern 64) the light directed to cell B1 will be greater than that directed to cell A1.

With the 90° reader of Figure 6 shifted 45° to the right, thus assuming the decimal digit 0 position relative to scale 20, the pattern is as shown at 64 or a maximum balance. This may be read as a binary "0" and may continue to be read as a binary "0" until the minimum balance pattern 65 is achieved at decimal digit 1 position which may be read as a binary "1." In traversing the reader between decimal digit 0 position and decimal digit 1 position of scale 20, the light directed to cell A1 will be greater than that directed to cell B1 and as indicated above may be read as a binary "0." Likewise in traversing the reader between decimal digit 1 position and decimal digit 2 position (pattern 64), the light directed to cell B1 will be greater than that directed to cell A1 and may be read as a binary "1." Since again there is a unique relationship existing between the amount of light directed to each cell A1 and B1 in traversing the reader from decimal digit 0 position of scale 20 to decimal digit 1 position and from decimal digit 1 position to decimal digit 2 position, etc., this provides a condition for interpolating between each of these positions as will be more fully explained hereinafter.

Reference is made to Figure 6*b*, which illustrates the phase relationship of light intensities IA and IB from the light source 22 directed to light sensitive devices A1 and B1, plotted against distance *d*, by a reader which is a mirror image of the reader of Figure 6. The same logic applies as explained for Figure 6*a* but with the light patterns shifted 90° or one-fourth cycle.

Figure 7 illustrates the least significant column of a reader with transparent areas 21A1 and 21B1 displaced with respect to each other a distance equal to 1¼ times the width of the like areas of the scale along the column, thus being 180°+45° or 225° out-of-phase with each other. Reference numerals 66—69 designate the patterns formed by transparent areas 21A1 and 21B1 in traversing the reader one complete cycle or 360° of the underlying least significant column 20–1 of scale 20. Figure 7*a* illustrates the phase relationship of light intensities IA and IB from a light source 22 directed respectively to photo-cells A1 and B1 coincident with transparent areas 21A1 and 21B1 of the reader as shown by patterns 66—69, plotted against distance *d*. In traversing from pattern 66 to pattern 67, a position of maximum balance is reached as shown by pattern 70. In traversing from pattern 68 to pattern 69, a position of minimum balance is reached as shown by pattern 71. Thus with a shift of the reader areas 67½°, to the right (i.e., a distance along the column equal to three-eighths the width of a like transparent area of the scale) with respect to the decimal digit 0 position of column 20–1 of scale 20, as shown by dotted line *n* in Figure 7*a*, the pattern at decimal digit 0 position of scale 20 would appear as at 70; with a shift of the reader areas 112½° to the left (i.e., a distance along the column equal to five-eighths the width of a like transparent area of the scale) with respect to the decimal digit 0 position of column 20–1 of scale 20, as shown by dotted line *p* in Figure 7*a*, the pattern at decimal digit 0 position of the scale 20 would appear as at 71.

With a shift of the reader areas 67½° to the right, the decimal digit 0 pattern would appear as at 70. In this position the light directed from a light source 22 to cells A1 and B1 coincident with transparent areas 21A1 and 21B1 would be balanced at a maximum value. The pattern 71 would then appear at the decimal digit 1 position of scale 20. As the reader traverses from decimal digit 0 position to decimal digit 1 position, the light directed to cell A1 will be greater than that directed to cell B1. At decimal digit 1 position, the light directed to cell A1 and B1 will again be equal, but at a minimum value as shown by pattern 71. As the reader traverses from decimal digit 1 position to decimal digit 2 position (pattern 70) the light directed to cell B1 will be greater than that directed to cell A1. With a shift of the reader 112½°, i.e., the complement of 67½°, to the left, as shown by dotted line *p* in Figure 7*a*, the pattern at decimal digit 0 position of scale 20 is as shown at 71 and the pattern at decimal digit 1 position of scale 20 is as shown at 70.

With the 225° reader of Figure 7 shifted to the right 67½°, thus assuming the decimal digit 0 position relative to scale 20, the pattern is as shown at 70 or a maximum balance. This may be read as a binary "0" and may continue to be read as a binary "0" until the minimum balance pattern 71 is achieved at decimal digit 1 position, which may be read as a binary "1." In traversing the reader between decimal digit 0 position and decimal digit 1 position of scale 20, the light directed to cell A1 will be greater than that directed to cell B1 and may be read as a binary "0." Likewise in traversing the reader between decimal digit 1 position and decimal digit 2 position (pattern 70) the light directed to cell B1 will be greater than that directed to cell A1 and may be read as a binary "1." Here again there is a unique relationship existing between the amount of light directed to each cell A1 and B1 in traversing the reader from decimal digit 0 position to decimal digit 1 position and from decimal digit 1 position to decimal digit 2 position, etc.; this provides a condition for interpolating between each of these positions as will be more fully explained as this description proceeds.

Reference is made to Figure 7*b* which illustrates the phase relationship of light intensities IA and IB from light source 22 directed to photo-cells A1 and B1, plotted against distance *d*, by a reader which is a mirror image of the reader of Figure 7. The same logic applies as explained for Figure 7*a* but with the light patterns shifted 90° or one-fourth cycle.

Figure 8 illustrates the least significant column of a reader with transparent areas 21A1 and 21B1 displaced with respect to each other a distance equal to one and three-fourths times the width of like areas of the scale along the column, thus being 180°+135° or 315° out-of-phase with each other. Reference numerals 72—75 designates the pattern of transparent areas 21A1 and 21B1 in traversing the reader one complete cycle or 360° of the underlying least significant column 20–1 of scale 20. Figure 8*a* illustrates the phase relationship of light intensities IA and IB from a light source 22 directed respectively to photo-cells A1 and B1 coincident with transparent areas 21A1 and 21B1 as shown by patterns 72—75, plotted against distance *d*. In traversing from pattern 72 to pattern 73, an intermediate position of maximum balance shown by pattern 76, is encountered. Also in traversing from pattern 74 to pattern 75, an intermediate position of minimum balance, shown by pattern 77, is encountered. Thus with a shift of the areas 22½° to the right (i.e., a distance along the column equal to one-eighth the width of a like transparent area of the scale) with respect to the decimal digit 0 position of column 20–1 of scale 20, as shown by dotted line *q* in Figure 8*a*, the pattern at decimal digit 0 position of scale 20 would appear as at 76; with a shift of the reader areas to the left 157½° (which is equal to moving a distance along the column equal to seven-eighths of the width of a like transparent area of the scale) with respect to the decimal digit 0 position of column 20–1 of scale 20, as shown by dotted line *r* in Figure 8*a*, the pattern at decimal digit 0 position of column 20–1 of scale 20 would then appear as at 77.

With a shift of the reader areas 22½° to the right, the decimal digit 0 pattern would appear as at 76. In this position the light directed from a light source 22 to photo-cells A1 and B1 coincident with transparent areas 21A1 and 21B1 would be balanced at a maximum value. The pattern 77 would then appear at decimal digit 1 position of scale 20. As the reader traverses from decimal digit 0 position to decimal digit 1 position, the light directed to cell A1 will be greater than that directed to cell B1. At decimal digit 1 position, the light directed to cells A1 and B1 will again be equal but at a minimum value as shown by pattern 77. As the reader traverses from decimal digit 1 position to decimal digit 2 position (pattern 76) the light directed to cell B1 will be greater than that directed to cell A1.

With a shift of the reader of 157½° or the complement of 22½°, to the left of the decimal digit 0 position of column 20–1 of scale 20 as shown by dotted line *r* in Figure 8*a*, the pattern at decimal digit 0 position of scale 20 is as shown at 77 and the pattern at decimal digit 1 position of scale 20 is as shown at 76.

With the 315° reader of Figure 8 shifted 22½° to the right, thus assuming the decimal 0 position relative to scale 20, the pattern is as shown at 76 or at a maximum balance. This may be read as a binary "0" and may continue to be read as a binary "0" until the minimum balance pattern 77 is achieved at decimal digit 1 position which may be read as a binary "1." In traversing the reader between decimal digit 0 position and decimal digit 1 position of scale 20, the light directed to cell A1 will be greater than that directed to cell B1 and may be read as a binary "0." Likewise in traversing the reader between decimal digit 1 position and decimal digit 2 position (pattern 76), the light directed to cell B1 will be greater than that directed to cell A1 and may be read as a binary "1." Since again there is a unique relationship existing between the amount of light directed to each light sensitive device A1 and B1 in traversing the reader from decimal digit 0 position of scale 20 to decimal digit 1 position and from decimal digit 1 position to decimal digit 2 position, etc., this provides a condition for interpolating between each of these positions as will be more fully explained hereinafter.

Reference is made to Figure 8*b*, which illustrates the phase relationship of light intensities IA and IB from light source 22 directed respectively to photo-cells A1 and B1, plotted against distance *d*, by a reader which is a mirror image of the reader of Figure 8. The same logic applies as explained for Figure 8*a* but with the light patterns shifted 90° or one-fourth cycle.

Figure 9 illustrates the least significant column of a reader 21 with transparent areas 21A1 and 21B1 being less than the width of like areas of the least significant column of an underlying natural binary scale and occurring in the same cyclic repetition. The transparent areas 21A1 are shifted with respect to areas 21B1 a distance of one and one-half times the width of apertures of the underlying column thus being 270° out-of-phase each with the other. Reference numerals 144—152 designate the patterns formed by transparent areas 21A1 and 21B1 of reader 21 in traversing the reader one complete cycle of the underlying least significant column 20–1 of scale 20. Figure 9*a* illustrates the phase relationship of light intensities IA and IB from a light source 22 directed to photo-cells A1 and B1 coincident with the transparent areas 21A1 and 21B1 as shown by patterns 144—152, plotted against distance *d*. A maximum balance between light directed to cell A1 and B1 is achieved when the reader 21 is in the position giving pattern 144 and a minimum balance is achieved at pattern 148. Pattern 144 may be chosen to represent decimal digit 0 position in Figure 9*a* and pattern 148 the decimal digit 1 position. As reader 21 traverses from decimal digit 0 position to decimal digit 1 position the light directed to cell B1 decreases monotonically, becoming zero at a point (146) half-way to decimal digit 1 position, at which point the light directed to cell A1 is still a maximum. In traversing from this point (146) to the decimal digit 1 position the light directed to cell B1 remains at zero and the light directed to cell A1 diminishes to zero at the decimal digit 1 position. At the decimal digit 1 position the light directed to both cells A1 and B1 is zero or a minimum balance as shown by pattern 148. In traversing from decimal digit 1 position to decimal digit 2 position (pattern 144), up to the half-way point (150) the light directed to cell A1 remains at zero while cell B1 goes from zero to a maximum during the second half of the travel the light to cell B1 remains at a maximum while that to cell A1 goes from zero to a maximum. In traversing the reader from decimal digit 0 position to decimal digit 1 position the light directed to cell A1 will be greater than that directed to cell B1 and may be read as a binary "0." Likewise in traversing the reader between decimal digit 1 position and decimal digit 2 position (pattern 148) the light directed to cell B1 will be greater than that directed to cell A1 and may be read as a binary "1." Since there is a unique relationship existing between the light directed to each photo-cell A1 and B1 in traversing reader 21 from decimal digit 0 position to decimal digit 1 position and from decimal digit 1 position to decimal digit 2 position, etc., this provides a condition for interpolating between each of these positions as will be more fully explained hereinafter.

Reference is made to Figure 9*b*, which illustrates the relationship of light intensities IA and IB from light source 22 directed respectively to photo-cell A1 and B1 plotted against distance *d*, by a reader which is a mirror image of the reader of Figure 9. The same logic applies as explained for Figure 9*a* but with the light patterns shifted 180° or one-half cycle.

Figure 10 illustrates the least significant column of a reader 21 with transparent areas 21A1 and 21B1 of greater width than like areas of the least significant column of an underlying natural binary scale and occurring in the same cyclic repetition. Transparent areas 21A1 and 21B1 are displaced with respect to each other a distance of two and one-half times the width of the aperture of the underlying column thus being 450° or effectively 90° out-of-phase each with the other. Reference numerals 153—156 designate the patterns formed by transparent areas 21A1 and 21B1 of reader 21 in traversing the reader one complete cycle or 360° of the underlying least significant column 20–1 of scale 20. Figure 10*a* illustrates the phase relationship of light intensities IA and IB from a light source 22 directed respectively to photo-cells A1 and B1 coincident with the transparent areas 21A1 and 21B1 as shown by patterns 153—156 plotted against distance *d*. A maximum balance between light directed to cell A1 and cell B1 is achieved when reader 21 is in the position giving pattern 153 and a minimum balance is achieved at pattern 155. Pattern 153 may be chosen to represent decimal digit 0 position in Figure 10*a* and pattern 155 the decimal digit 1 position. As reader 21 traverses from decimal digit 0 position, maximum balance, to decimal digit 1 position, minimum balance, the light directed to cell A1 will be greater than that directed to cell B1. At decimal digit 1 position the light directed to cells A1 and B1 will again be equal but at a minimum value as shown by pattern 155. As the reader traverses from decimal digit 1 position to decimal digit 2 position (pattern 153) the light directed to cell B1 will be greater than that directed to cell A1. In traversing the reader between decimal digit 0 position and decimal digit 1 position of scale 20, the light directed to cell A1 will be greater than that directed to cell B1 and may be read as a binary "0." Likewise in traversing the reader between decimal digit 1 position and decimal digit 2 position (pattern 153), the light directed to cell B1 will be greater than that directed to light sensitive device A1 and may be read as a binary "1." Since again there is a unique relationship existing between the amount of light directed to each cell A1 and B1 in traversing the reader from the decimal digit 0 position of scale 20 to decimal digit 1 position and from decimal digit 1 position to decimal digit 2 position, etc., this provides a condition for interpolating between each of these positions as will be more fully explained hereinafter.

Reference is made to Figure 10*b*, which illustrates the phase relationship of light intensities IA and IB from a light source 22 directed respectively to photo-cells A1 and B1 plotted against distance *d*, by a reader which is a mirror image of the reader of Figure 10. The same logic applies as explained for Figure 10*a* but with the light patterns shifted 180° or one-half cycle.

Referring now to Figure 2 transparent areas 21A2, 21A3, 21A4, 21A5, etc., and 21B2, 21B3, 21B4, 21B5, etc., in the columns more significant than the least significant column of reader 21 have the edges of two first such areas contiguous with each other and with the center line of the reader and occur on each side of the center line in the same cyclic repetition as the transparent areas of corresponding columns of scale 20 in Figure 1. The dimensions, measured along the column of said reader areas are finite but no more than one-half the dimension of the corresponding column of scale 20 to avoid ambiguity in these columns. With an optical sensing system the larger dimensions are preferred due to greater light transmission and provide greater sensitivity.

Referring now to Figure 11 where is shown the reader 21 of Figure 2 positioned in the decimal digit 0 position on scale 20 of Figure 1. The transparent areas 21A1 and 21B1 are equal and the light directed from source 22 to photo-cells A1 and B1 coincident with areas 21A1 and 21B1 respectively of reader 21 is in equality. This, as will be seen later, is a condition of maximum balance and the reading obtained from column 20–1 in this condition is defined as a binary "0."

Referring to Figure 20, photo-cells A1 and B1 are arranged in a conventional bridge circuit 25 and each subsequent pair of photo-cells A2, B2, A3, B3, . . . A*n* and B*n* are arranged in circuits 39, 40 and 41 such that each of a cell pair produces an output when energized. A bias voltage source 42 may be provided for circuits 39, 40 and 41 for adjustment to a predetermined light threshold below which a binary "0" is indicated and above which a binary "1" is indicated. This allows for adjustment for stray light.

The output from the bridge 25, when photo-cells A1 and B1 are balanced, is zero. In this case, there being a zero signal applied to amplifier 27, flip-flop 28 remains in its previous condition, either providing a signal, binary "0" or a zero signal, binary "1." If reader 21 has moved to the right on scale 20 to reach the decimal digit 0 position, flip-flop 28 will be in the zero signal, binary "1" condition. Relay R1 will remain inactivated and column 20–2 of scale 20 will be read by cell B2. Since the transparent areas of column 20–2 are now coincident with the transparent areas of the corresponding column of the reader, cell B2 will receive light from source 22 and develop a signal. The output signal from cell B2 is amplified by amplifier 29 and applied to the input of flip-flop 43 and since the flip-flop was previously in a signal condition, there being no change, flip-flop 43 remains in a binary "1" condition. The signal output from amplifier 29 is further applied to relay R2 which is activated and a reading in column 20–3 of scale 20 is taken from cell B3. Cell B3, being illuminated, produces a signal which is amplified by amplifier 30 and applied to the input of flip-flop 44 which, being in a signal condition, remains in the binary "1," condition. This condition is repeated for each column 20–4 to **20–*n* of scale 20. For the five column scale of Figure 1, the binary reading would be 11111 or decimal 31**.

If reader 21 has moved to the left on scale 20 to reach the decimal digit 0 position, flip-flop 28 will be in the signal, binary "0," condition. Relay R1 will be activated and column 20–2 of scale 20 will be read by cell A2. Since opaque areas of column 20–2 are coincident with transparent areas 21A2 of reader 21, there is a zero signal developed by cell A2 to be amplified by amplifier 29. Flip-flop 43, previously in a no-signal condition and there being no change, remains in the binary "0" condition. There being a zero signal output from amplifier 29, relay R2 remains inactivated and a reading is taken from cell A3. Cell A3 being dark produces a zero output to be amplified by amplifier 30 and applied to the input of flip-flop 44 which, being in a zero signal condition, remains in the binary "0" condition. This condition is repeated for each column 20–4 to **20–*n* of scale 20**. For the five column scale of Figure 1, the binary number would be 00000 or decimal digit 0.

When reader 21 is moved to the right along scale 20 to a position midway between decimal digit 0 and decimal digit 1 position, the pattern will appear as at Figure 12. Cell A1 being brighter than B1, a positive output is developed in bridge 25, which is amplified by amplifier 27 and applied to input of flip-flop 28. When flip-flop 28 receives a positive signal, an output signal is developed which is read as a binary "0" in column 20–1. This output signal activates relay R1 and cell A2 is read in column 20–2. Cell A2 being dark, a zero signal is developed to be amplified by amplifier 29 and applied to flip-flop 43. If flip-flop is in a signal or binary "1" condition, a change is sensed and the flip-flop changes to the zero signal or binary "0" condition. If the flip-flop is in the zero signal or binary "0" condition, it remains in that condition. In the absence of an output from amplifier 29, relay R2 remains inactivated and cell A3 is read in column 20–3. Cell A3 being dark the above procedure is repeated for each column 20–4 to **20–*n*** of the scale. For the five column scale of Figure 1, the binary reading of Figure 12 is 00000 or decimal digit 0.

Moving reader 21 to the decimal digit 1 position of scale 20 gives the pattern of Figure 13. In this position the output from cell A1 and B1 will again be equal and there is a zero output from bridge 25 to be amplified by amplifier 27 and applied to flip-flop 28. With either a negative input or zero input signal, there is an absence of a signal at the output of flip-flop 28. The absence of a signal from flip-flop 28 is read as a binary "1" in column 20–1. Further, relay R1 remains inactivated and cell B2 is read in column 20–2. Cell B2 being dark, a zero signal is developed to be amplified by amplifier 29 and applied to flip-flop 43. Since flip-flop 43 was previously in a zero signal or binary "0" condition, it remains in that condition. In the absence of an output from amplifier 29, relay R2 remains inactivated and cell A3 is read in column 20–3. Cell A3, being dark, produces zero output to be amplified by amplifier 30 and applied to the input of flip-flop 44 which, being in a zero signal condition, remains in the binary "0" position. The above procedure is repeated for each column 20–4 to **20–*n*** of the scale. In the five column scale of Figure 1 the binary reading of Figure 13 is 00001 or decimal digit 1.

Moving reader 21 to a position midway between decimal digit 1 and decimal digit 2 positions gives the pattern of Figure 14. In this position cell B1 being brighter than cell A1 a negative output is developed in bridge 25, which is amplified by amplifier 27 and applied to flip-flop 28. When flip-flop 28 receives a negative signal, zero output is developed. This condition is read as a binary "1" in column 20–1. In the absence of a signal from flip-flop 28, relay R1 remains inactivated and cell B2 is read in column 20–2. Cell B2 being dark, a zero signal is developed to be amplified by amplifier 29 and applied to flip-flop 43. Since flip-flop 43 is in the zero signal or binary "0" condition, it remains in the binary "0" condition. In the absence of an output from amplifier 29, relay R2 remains inactivated and cell A3 is read in column 20–3. Cell A3 being dark, produces zero output to be amplified by amplifier 30 and applied to the input of flip-flop 44 which, being in a zero signal condition, remains in the binary "0" position. The above procedure is repeated for each column 20–4 to 20–*n* of the scale. For the five column scale of Figure 1, the binary reading of Figure 14 is 00001 or decimal digit 1.

Moving reader 21 to the decimal digit 2 position of scale 20 gives the pattern of Figure 15. In this position the output from cells A1 and B1 will again be equal and there is a zero output from bridge 25 to be amplified by amplifier 27 and applied to flip-flop 28. With either a negative input or zero input, there is an absence of a signal at the output of flip-flop 28. The absence of a signal from flip-flop 28 is read as a binary "1" in column 20–1. Relay R1 remains inactivated and cell B2 will be read in column 20–2. Cell B2 being dark, a zero signal is developed to be amplified by amplifier 29 and applied to flip-flop 43. Since flip-flop 43 is in the zero signal or binary "0" condition, it remains in the zero signal or binary "0" condition. In the absence of an output from amplifier 29, relay R2 remains inactivated and cell A3 is read in column 20–3. Cell A3 being dark, produces zero output to be amplified by amplifier 30 and applied to the input of flip-flop 44 which, being in a zero signal condition, remains in the binary "0" position. The above procedure is repeated for each column 20–4 to 20–*n* of the scale. For the five column scale of Figure 1, the binary reading of Figure 15 is read as 00001 or decimal digit 1.

Moving reader 21 to a position midway between decimal digit 2 and decimal digit 3 positions, the pattern will appear as that of Figure 16. In this position cell A1 being brighter than cell B1 a positive output signal is developed in bridge 25, which is amplified by amplifier 27 and applied to flip-flop 28. When flip-flop 28 receives a positive signal, an output is developed. This condition is read as a binary "0" in column 20–1. Relay R1 is activated by the signal from flip-flop 28 and cell A2 is read in column 20–2. Cell A2 being light, a signal is developed, amplified by amplifier 29 and applied to flip-flop 43. Since flip-flop 43 is in the zero signal condition, the change is sensed and the output from flip-flop is changed to the signal or binary "1" condition. Thus column 20–2 is read as a binary "1." The output signal from amplifier 29, activates relay R2 and cell B3 is read in column 20–3. Cell B3 being dark, a zero signal is applied to amplifier 30 to be amplified and applied to flip-flop 44. With the absence of a signal at the input of flip-flop 44, since flip-flop 44 was previously in a zero signal or binary "0" condition, the output from flip-flop remains in the zero signal or binary "0" condition. In the absence of an output from amplifier 30, the relay from the next column 20–4 is inactivated and cell A4 is read in column 20–4. Since the A4 cell is dark in column 20–4, the above procedure is repeated for each column 20–5 to 20–*n* of the scale. For the five column scale of Figure 1, the binary reading of Figure 16 is read as 00010 or decimal digit 2.

It will be noted in the above reading procedure that in reading columns preceded by columns more significant than the least significant column, when the previous column read is dark the A cell is read in the next column and when the previous column read is light the B cell is read in the next column. This procedure is reversed where an output signal from bridge 25 is read as a binary "1."

With a reader designed such that the maximum balance in the least significant column occurs at the decimal digit 0 position, the A1 cell being bright is read as a binary "0," as also the balance positions and the B1 cell being bright is read as a binary "1." In reading subsequent columns when the A1 cell is light in column 20–1 the A2 cell is read in the next column 20–2 and when the B1 cell is light in column 20–1, the B2 cell is read in the next column 20–2. The balance conditions are arbitrarily read as a zero signal or binary "1" with this reader. It is obvious this could be chosen to represent a binary "0" with equal results with appropriate reading circuit modifications.

With a reader designed with the minimum balance position of column 20–1 occurring at the decimal digit 0 position, being a mirror image of the above reader, the B1 cell being bright is read as a binary "0," as also the balance positions and the A cell being bright is read as a binary "1." Unlike the reading procedure of the above reader, when the A1 cell is bright, the B2 cell is read in the next column 20–2, and when the B1 cell is bright the A2 cell is read in the next column 20–2. The balance conditions are arbitrarily read as a signal or binary "0" with this reader. It is again obvious that this could be chosen to represent a binary "1" with equal results with appropriate reading circuit modifications.

Having set forth the basic logic and operation of the reader of this invention with a natural binary scale, attention is now directed to the interpolation of the least significant column. Reference is made to Figure 22 showing graphically the phase relationship of voltages VA1 and VB1, plotted against distance, developed by photo-cells 1A1 and 1B1, Figure 21, from light directed thereto from light source 22 by the 270° reader of Figure 2 in conjunction with the natural binary scale 20 of Figure 1. Figure 22 further represents graphically the voltages developed by light patterns 60, 61, 62 and 63 of Figure 6. As previously noted, there is a unique relationship between the light directed to A1 and B1 in each position of the reader 21 in traversing one complete cycle of the least significant column of scale 20. Points 78 and 82, corresponding to patterns 64 and 65, represent balance points and are generally chosen to represent decimal 0 or decimal 1 position because switching can be made more precise when the light directed to A1 and B1 is equal as will be seen later. These positions 78 and 82 are located at points on a line 103 drawn at 45° with respect to the abscissa and ordinate of Figure 22, and occur at the intersection of the graphical representation of voltage developed by cells 1A1 and 1B1 of Figure 21. For example where point 78 is chosen to represent decimal digit 0, point 82 would represent decimal digit 1 and vice versa. In a three digit binary scale decimal 0, would be 000 and decimal 1, would be 100. One method of identifying these positions and points between will now be outlined and circuitry for accomplishing this electronically is set forth in Figure 21.

Referring to Figure 22, V represents the vector sum of voltages VA1 and VB1 developed by cells A1 and B1 of circuit 25′, Figure 21. While vector V follows essentially a square pattern, voltages VA1 and VB1 may be made to bear essentially a circular relationship to each other, either by proper shaping of the reader openings or by using non-linear amplification, etc. For the purpose of explanation, the relationship will be assumed to be essentially circular as represented by dotted line 104 in Figure 22. For practical purposes the deviation from a circle will not significantly affect the accuracy of the readings.

The vector voltage V may be represented by the equation $V=VA1\cos\alpha+VB1\text{ sine }\alpha$ where $\alpha$ is the vector angle.

In order to detect changes in the amplitude and angle of vector voltage V, a second vector voltage V′ is developed equivalent to V by means of resolver potentiometers 90 and 91, Figure 23. Voltages VA1 and VB1 are added in summing circuit 88, Figure 21 and applied to one input of differential amplifier 89. The output of amplifier 89, V′, is applied to one end of the winding of potentiometers 90 and 91 respectively, the other end being connected to ground potential. Wiping contacts on arms 97 and 98 trace out a circular pattern equivalent to that traced by the vector voltage V. The potential appearing on these contacts will be equivalent to voltages VA1 and VB1. The output from potentiometer 90 represents a voltage VA1′ and the output from potentiometer 91 represents a voltage VB1′. Vector voltage V′ may then be set forth as $$V'=VA1'\cos\alpha'+VB1'\text{ sine }\alpha'$$

In order for vector V to be equal to V′, the value of $VA1 \cos \alpha + VB1 \text{ sine } \alpha$ is equilibrated to the value $VA1' \cos \alpha' + VB1' \text{ sine } \alpha$. This is feasible because $\alpha$ and $\alpha'$ being in the first quadrant, the sine and cosine of $\alpha$ will always be positive as will be the light values energizing the photo-cells. The positioning of contacts 97 and 98 such that $\alpha = \alpha'$ is accomplished by servo motor 105 as will be presently explained.

The outputs from potentiometers 90 and 91 are added in summing circuit 92, Figure 21 and applied to the other input of differential amplifier 89. Since $\alpha$ is made to equal $\alpha'$ the gain of amplifier 89 may be adjusted, in a known manner, such that $VA1 + VB1 = VA1' + VB1'$. When this condition is satisfied then the output V′ of amplifier 89 is equal in magnitude to V.

In positioning shaft 101 and contacts 97 and 98 such that $\alpha = \alpha'$ use is made of the condition that when $\theta = \theta'$, then $\alpha = \alpha'$. The angle $\theta$ may be measured from starting point such as point 85, and is the angle of radius formed by vector R between this point, and the point on the circle 104 defined by the vector V. $\theta'$ is the angle between a similar starting point on the potentiometers 90 and 91 and the sliding contact arm, i.e. vector R′. Vector V and vector R define the same voltages but with respect to different origins. The translation from vector V to vector R is necessitated because light does not assume negative values.

When the voltages VA1 and VB1 developed by cells A1 and B1 change, altering the position and magnitude of vector V, there will be an angular deviation between $\theta$ and $\theta'$. The gain of amplifier 89 is adjusted such that the magnitude of V′ is equal to the magnitude of V. It is to be seen that the adjustment of amplifier 89 takes place concurrently with the servoing of shaft 101 to equilibrate $\alpha$ with $\alpha'$. The output voltage VA1′ from potentiometer 90 and the output voltage VA1 from cell A1, are compared in amplifier 95 which produces a positive and negative voltage equivalent to the error between VA1 and VA1′. From Figure 22 it is seen that this error equals $d$VA1. These positive and negative error voltages are applied to either end of the potentiometer 96 having a center tap at ground potential. The output from slider 100 of potentiometer 96 is equal to $d\text{VA1} \text{ sine } \theta$. Voltages VB1 and VB1′ are similarly applied to amplifier 93 which produces a positive and negative voltage equivalent to the error between VB1 and VB1′. From Figure 22 it is seen that this error equals $d$VB1. These positive and negative error voltages are applied to either end of the potentiometer 94 having a center tap at ground potential. The output from slider 99 of potentiometer 94 is equal to $d\text{VB1} \cos \theta$.

The angle $d\theta$ is the angular change of vector voltage R when reader 21 moves along scale 20. From Figure 22 it is seen that $Rd\theta = dVA1 \text{ sine } \theta + dVB1 \cos \theta$. The outputs from potentiometers 94 and 96 are summed in differential amplifier 102 to produce an output equivalent to R$d\theta$. The output of amplifier 102 is applied to servo motor 105 to produce a rotation of shaft 101 and attached contact arms 97, 98, 94 and 96 in a direction and by an amount such that the contact arms are repositioned to an angular position equivalent to the new angular position of vector voltage V. When this condition is satisfied $Rd\theta = 0 = R(\theta' = \theta) = dVA1 \text{ sine } \theta + dVB1 \cos \theta$ and therefore $\theta = \theta'$.

Referring to Figure 21, the sum of voltages VA1 and VB1 is applied to a first input of differential amplifier 89. The output voltage V of amplifier 89 is applied to one input of resolver potentiometers 90 and 91 and the other input being at ground potential. The output voltages from slider contacts 97 and 98 of resolver potentiometers 90 and 91 respectively represent VA1′ and VB1′. Voltages VA1′ and VB1′ are added by a resistive adder network 92. The sum of voltages VA1′ and VB1′ is applied to the other input of differential amplifier 89 and the output voltage of amplifier 89 controlled such that the sum of voltages VA1 and VB1 is equal to the sum of voltages VA1′ and VB1′ such that the condition $VA1 + VB1 = VA1' + VB1'$ exists. Voltage VB1 is further applied to a first input of differential amplifier 93 and voltage VB1′ is applied to the other input. A first output voltage, $-d$VB1 from amplifier 93, is applied to one end of the winding of a resolver potentiometer 94, having a center tap connected to ground potential. A second output voltage, $+d$VB1, from amplifier 93 is applied to the other end of the winding of resolver potentiometer 94. Similarly voltage VA1 is applied to a first input of differential amplifier 95 and voltage VA1′ is applied to the other input. A first output voltage, $-d$VA1, from amplifier 95 is applied to one end of the winding of a resolver potentiometer 96, having a center tap connected to ground potential. A second output voltage, $+d$VA1, from amplifier 95, is applied to the other end of the winding of resolver potentiometer 96. Wiper contact arms 97–100 of potentiometers 90, 91, 94 and 96 are identically mounted for rotation on shaft 101 which is connected to the rotor of servo motor 105.

The output from slider 99 of potentiometer 94 is equivalent to $d\text{VB1} \cos \theta$ and the output from slider 100 of potentiometer 96 is equivalent to $d\text{VA1} \text{ sine } \theta$. These voltages are applied to the input of differential amplifier 102 which solves the equation $$dVB1 \cos \theta + dVA1 \text{ sine } \theta = Rd\theta$$

and develops an output equivalent to $d\theta$ since R is assumed constant for all practical purposes. Where $d\theta = 0$, $d$VA1 and $d$VB1 are also zero, and shaft 101 will be at a fixed angular relationship with vector R of Figure 22. The rotation of vector R, representing the movement of reader 21 from 78 to 79 causes an output $d\theta$ to be developed which when applied to servo 105 produces rotation of shaft 101 in a direction and by an amount sufficient to create a zero output from amplifier 102 at which point $d\theta = 0$ and shaft 101 has moved the same number of degrees in the same direction as reader 21 in that particular cycle of scale 20.

Figure 19 shows a circular natural binary scale 120 having a plurality $m$ of $n$ columns of transparent areas and $2^n$ rows on a generally opaque background or vice versa where $n$ is the number of digits in the scale. Circular scale 120 is fixedly mounted on shaft 101 for rotation therewith, Figure 21. A circular 90° readers 121 constructed according to this invention is adjustably mounted adjacent circular scale 120 and positioned coaxially therewith.

A light source 122 is positioned to direct light through transparent areas of scale 120 and reader 121 to light sensitive cells 2A1, 2BE, 2A2, 2B2, etc., coincident with columns 121–1, 121–2, etc., of reader 121, Figure 19. Optical systems 123 and 124 serve to collect light from source 122 and direct light passing through areas 121A1 and 121B1 of reader 121 to photo-cells 2A1 and 2B1 in a well known manner. Cells 2A1 and 2B1 are arranged in a conventional bridge circuit 125 such that when equal amounts of light fall on each cell the output from the bridge is zero. If the light falling on cell 2A1 is greater than that falling on cell 2B1, the bridge output is positive, and if the light falling on cell 2B1 is greater than that falling on cell 2A1, the bridge output is negative. The output from the bridge 125 is connected to input of amplifier 127. Amplifier 127 is so designed that when the light falling on cells 2A1 and 2B1 is balanced and the output from the bridge is zero, the output of amplifier 127 is zero and when the output from bridge 125 is negative or positive, the output from amplifier 127 is a negative or positive value respectively.

The output of amplifier 127 is connected to the input of flip-flop 128. When the output from amplifier 127 is positive flip-flop 128 is designed to produce an output sufficient to operate relay 1R1. The presence of a signal from flip-flop 128 is defined as a binary "0" in the least significant column of scale 120, being read by cells 2A1 and 2B1 of bridge 125. When the output from amplifier 127 is negative the output from flip-flop 128 is zero and the absence of a signal from flip-flop 128 being defined as a binary "1" in the least significant column. When the output from amplifier 127 is zero, the flip-flop 128 will not be energized and the output therefrom remains the same as the previous reading.

Cells 2A1, 2B1, . . . $n$A1, $n$B1 are positioned to read respectively transparent areas 121A2, 121B2 . . . 121A$n$, 121B$n$ in each more significant column of scale 120 and are arranged in circuits 139 and 140 such that each of a pair of cells produces an output when energized. A bias voltage source 142 may be provided for circuits 139 and 140 for adjustment to a predetermined light threshold below which a binary "0" is indicated and above which a binary "1" is indicated. A switching means, such as relay 1R1, is provided and arranged such that which when cell 1A1 is bright, 2B1 is read and when cell 1A1 is dark cell 2A1 is read. The state of 2A1 and 2B1 determines which cell is read in the next column. If the cell 2A1 is light, the B cell is read in the next column and 2A1 is dark, the A cell is read in the next column. In a subsequent column if the cell read in the previous column is dark, the A cell is read; if the cell in the previous column is light, the B cell is read.

When a signal is derived from flip-flop 128, indicating cell 1A1 is or has been read as bright, the signal energizes relay 1R1 and cell 2B1 is read. If cell 2B1 is dark there is no output therefrom and the output of amplifier 129 and flip-flop 143 is zero, this represents in this and subsequent columns a binary "0". In this case the relay for the next pair of cells is not energized and the reading in the next column of scale 120 is taken on the A cell. If in the above instance cell 2B1 is light, a signal is developed which is amplified by amplifier 129 and applied to flip-flop 143 which develops an output, representing a binary "1." In this instance the output energizes the relay for the next pair of cells and the reading in the next column is taken on the B cell. This same reading pattern is followed for all subsequent column readings.

The signal or zero signal, as the case may be, from each flip-flop 128, 143, 144 etc., may be fed to computer 133, the output of which is connected to the coil of relay R1 of Figure 20. The computer 133 is arranged such that a signal will appear at the output as the reader 21 moves from decimal digit 0 position to decimal digit 1 position or from an even to an odd number and a zero signal will appear at the output when the reader 21 moves from the decimal digit 1 position to the decimal digit 2 position or from an odd to an even number. The outputs from flip-flops 128, 143, 144, etc., may be fed to computer 33, Figure 20, to be converted to analog data for actuating servo motor 35 in accordance with instructions from programmer 34 as previously outlined.

The error accruing from using a circular resolver for resolving the rectangular light relationship will in most cases be negligible; however, where desired amplifiers 86 and 87 may be of non-linear design to convert the output from cells A1 and B1 to a circular function. Correction may also be applied in the design of the least significant column of scale 120 to compensate for a discrepancy.

Although the above described embodiments disclose the invention as adapted to being read optically, it is to be understood that the scale and reader may be constructed to accept other types of reading systems. In reading a natural binary scale and the reader of this invention with reading systems other than optical, i.e., magnetic, inductive, capacative, or mechanical, a similar interpolation may be made of the least significant column with suitable circuit modifications.

Various modifications may be made in the optical sensing system within the teaching of this invention, such as multiple light, single cell, multiple light-area cell and electro-luminescent source, among others as will be understood by those skilled in the art.

Referring to Figures 9 and 10 it is seen that the reader of this invention may be provided with areas in the least significant column less than the width of the areas of the least significant column of the binary scale with which it is used as well as areas larger than those of the binary scale and the same theory of operation applies.

Referring to Figure 17 which shows a portion of the binary scale of Figure 1 with a reader according to this invention where the width of both the least significant column areas and the areas of the more significant columns have been modified. Such modifications follow the same theory of operation as the reader used as an illustration of one embodiment of the invention and may better lend themselves to a particular use. While reader areas in columns more significant than the least significant column are preferably one-half or less of the width of corresponding like areas of the underlying scale column, a reader having reader areas in these columns greater than one-half but less than the full width of corresponding like areas of the underlying scale is operative and satisfactory for all practical purposes.

It will be apparent from the foregoing that the least significant column of the reader of this invention may be used separately as an indexing means apart from the complete reader of this invention as shown by Figures 3 to 10.

It will be further apparent to those skilled in the art that the reader of this invention will function as a binary scale reader in the absence of an indexing column. In such a reader the reader areas in each column are identically finite and less than the dimension, measured along the column, of like areas of the corresponding column of the natural binary scale with which it is to be used, and occur in each direction, along the column, away from the center line in the same cyclic repetition as the like areas of the corresponding column of the natural binary scale with which the reader is to be used. The resulting array of the reader areas are symmetrically disposed about the center line. Such a reader will find utility where the interpolation of the least significant column is not required.

While there have been described what at present are considered to be the preferred embodiments of this invention, it will be obvious to those skilled in the art that various changes and modifications may be made therein without departing from the invention. It is aimed therefore in the appended claims to cover all such changes and modifications which fall within the true spirit and scope of the invention.

We claim:

1. In a binary scale and reader combination: a natural binary scale comprising a plate having effectively opaque and effectively transparent durable areas, one class of such areas being arranged in accordance with a natural binary progression having a plurality of $n$ columns and a plurality of $2^n$ rows, where $n$ is the number of digits in the scale, adjacent columns progressing from one side of the scale having successively greater digital significance; and a reader comprising a plate having a plurality of $n$ columns of effectively opaque and effectively transparent durable areas mounted in superposition on said scale for contiguous movement relative thereto in the direction of the scale columns, said reader having said one class of such reader areas disposed about a centerline parallel with the rows of the scale, with the least significant column of said reader areas coactively associated with the least significant column of the scale, those reader areas in each column of the reader more significant than the least significant column being identically finite and of lesser columnwise dimension than the associated like areas of the scale, said reader areas occurring in each direction, along the column, away from the center line in the same cyclic repetition as the like areas of the corresponding associated column of the scale, the resulting array of said reader areas in each column of the reader more significant than the least significant column, being symmetrically disposed about said center line, the reader areas of the least significant column of the reader being identically finite and of up to twice the columnwise dimension of the associated like areas of the least significant column of the scale and occurring in the same cyclic repetition; means for effecting relative movement between said reader and said scale in a direction along said columns; and a plurality of $n$ sensing means positioned to each side of the reader center line, each in registry with a reader column and fixedly mounted with respect to the reader.

2. For use with a natural binary scale, a reader comprising a plate having a plurality $n$ of columns of effectively opaque and effectively transparent durable areas, where $n$ is the number of digits in the binary scale, adjacent columns progressing from one side of the reader connoting successively greater digital significance, said reader having one class of such reader areas disposed about a center line perpendicular to said columns, those reader areas in each column more significant than the least significant column of the reader being identically finite and of lesser columnwise dimension than like areas of the corresponding column of the natural binary scale with which the reader is to be used, said reader areas occurring in each direction, along the column, away from the center line in the same cyclic repetition as the like areas of the corresponding column of the binary scale with which the reader is to be used, the resulting array of said reader areas in each column of the reader more significant than the least significant column of the reader being symmetrically disposed about said center line, and said reader areas of the least significant column of the reader being identically finite and of up to twice the dimension, measured along the column, of like areas of the least significant column of the natural binary scale with which the reader is to be used and occurring in the same cyclic repetition.

3. In a binary scale and reader combination: a natural binary scale comprising a plate having effectively opaque and effectively transparent durable areas, one class of such areas being arranged in accordance with a natural binary progression having a plurality $n$ of columns and a plurality of $2^n$ rows, where $n$ is the number of digits in the scale, adjacent columns progressing from one side of the scale having successively greater digital significance; and a reader comprising a plate having a plurality $n$ of columns of effectively opaque and effectively transparent durable areas mounted in superposition on said scale for continuous movement relative thereto in the direction of the scale columns, said reader having said one class of such reader areas disposed about a center line parallel with the rows of the scale, with the least significant column of said reader areas coactively associated with the least significant column of the scale, those reader areas in each column of the reader more significant than the least significant column being identically finite and of lesser columnwise dimension than the associated like areas of the scale, said reader areas occurring in each direction, along the column, away from the center line in the same cyclic repetition as the like areas of the corresponding associated column of the scale, the resulting array of said reader areas, in each column of the reader more significant than the least significant column, being symmetrically disposed about said center line, the reader areas of the least significant column of the reader being identically finite and of up to twice the columnwise dimension of the associated like areas of the least significant column of the scale and occurring in the same cyclic repetition.

4. In a binary scale and reader combination: a natural binary scale comprising an opaque plate having transparent durable areas arranged in accordance with a natural binary progression having a plurality $n$ of columns, and a plurality of $2^n$ rows, where $n$ is the number of digits in the scale, adjacent columns measured from one side of the plate having successively greater digital significance; and an opaque reader having transparent durable reader areas mounted in superposition on said scale for contiguous movement relative thereto in the direction of the scale columns, said reader having a plurality $n$ of columns of transparent reader areas disposed about a centerline with the least significant column of said transparent reader areas coactively associated with the least significant column of the scale, those transparent reader areas in each column more significant than the least significant column of the reader being finite and of lesser columnwise dimension than the transparent areas of the corresponding associated column of the scale, a transparent reader area in each more significant column lying entirely to one side of the reader center line, drawn parallel to the rows of the scale, and subsequent transparent reader areas to said one side of the center line occurring in the same cyclic repetition as the transparent areas of the underlying column of the scale, apart from the least significant column of the reader, the transparent areas to the other side of the center line being a mirror image of the transparent reader areas on said one side of the center line, the resulting array of transparent reader areas, apart from the least significant column of the reader, being symmetrically disposed about said center line, the transparent reader areas of the least significant column of the reader being identically finite and of up to twice the columnwise dimension of like areas of the least significant column of the natural binary scale with which the reader is to be used and occurring in the same cyclic repetition.

5. For use with a natural binary scale a reader comprising a plate having a plurality $n$ of columns of effectively opaque and effectively transparent durable areas, where $n$ is the number of digits in the binary scale, adjacent columns progressing from one side of the reader connoting successively greater digital significance, said reader having one class of such reader areas disposed about a reader center line, those reader areas in each column more significant than the least significant column of the reader being identically finite and of lesser columnwise dimension than like areas of the corresponding column of the natural binary scale with which the reader is to be used, each of two first said reader areas centrally located in each column more significant than the least significant column of the reader having a center line spaced from the reader center line a distance equal to an integral X number of cycles on the corresponding column of the natural binary scale with which the reader is to be used less a distance in cycles equal to the expression $$X-\frac{w}{2}$$

where $w$ is the width of said reader area in cycles, said reader areas occurring in each direction along the column away from the center line, in the same cyclic repetition as the like areas of the corresponding column of the natural binary scale with which the reader is to be used, the resulting array of said reader areas in each column of the reader more significant than the least significant column of the reader being symmetrically disposed about said center line, said reader areas of the least significant column of the reader being identically finite and of up to twice the columnwise dimension of like areas of the least significant column of the natural binary scale with which the reader is to be used and occurring in the same cyclic repetition.

6. In a binary scale and reader combination: a natural binary scale comprising a plate having effectively opaque and effectively transparent durable areas, one class of such areas being arranged in accordance with a natural binary progression having a plurality $n$ of columns and a plurality of $2^n$ rows, where $n$ is the number of digits in the scale, adjacent columns progressing from one side of the scale having successively greater digital significance; and a reader comprising a plate having a plurality $n$ of columns of effectively opaque and effectively transparent durable areas mounted in superposition on said scale for contiguous movement relative thereto in the direction of the scale columns, said reader having said one class of such reader areas disposed about a reader center line parallel with the rows of the scale, with the least significant column of said reader areas positioned above the least significant column of the scale, those reader areas in each column of the reader more significant than the least significant column being identically finite and of lesser columnwise dimension than the underlying like areas of the scale, each of two first said reader areas centrally located in each column more significant than the least significant column of the reader having a center line spaced from the reader center line a distance equal to an integral X number of cycles on the corresponding column of the natural binary scale with which it is to be used less a distance in cycles equal to the expression $$X-\frac{w}{2}$$

where $w$ is the width of said reader area in cycles, said reader areas occurring, in each direction along the column away from the center line, in the same cyclic repetition as the like areas of the corresponding underlying column of the scale, the resulting array of said reader areas, in each column of the reader more significant than the least significant column, being symmetrically disposed about said center line, said reader areas of the least significant column of the reader being identically finite and of up to twice the columnwise dimension of the underlying like areas of the least significant column of the scale and occurring in the same cyclic repetition.

7. In a binary scale and reader combination: a natural binary scale comprising an opaque plate having transparent durable areas arranged in accordance with a natural binary progression having a plurality $n$ of columns and a plurality of $2^n$ rows, where $n$ is the number of digits in the scale, adjacent columns, measured from one side of the plate having successively greater digital significance; and an opaque reader having transparent durable reader areas mounted in superposition on said scale for contiguous movement relative thereto in the direction of the scale columns, said reader having a plurality $n$ of columns of transparent reader areas disposed about a reader center line drawn parallel to the rows of the scale with the least significant column of said transparent reader areas positioned above the least significant column of the scale, the transparent reader areas in each column more significant than the least significant column of the reader being finite and of lesser columnwise dimension than the transparent areas of the corresponding underlying column of the scale, a transparent reader area in each more significant column lying entirely to one side of the reader center line, said reader area centrally located in each column more significant than the least significant column of the reader having a center line spaced from the reader center line a distance equal to an integral X number of cycles and on the corresponding column of the natural binary scale with which it is to be used less a distance in cycles equal to the expression $$X-\frac{w}{2}$$

where $w$ is the width of said reader area in cycles, subsequent transparent reader areas to said one side of the center line occurring in the same cyclic repetition as the transparent areas of the underlying column of the scale, apart from the least significant column of the reader, the transparent areas to the other side of the center line being a mirror image of the transparent reader areas on said one side of the center line, the resulting array of transparent reader areas, apart from the least significant column of the reader, being symmetrically disposed about said center line, the transparent reader areas of the least significant column of the reader being identically finite and of up to twice the columnwise dimension of like areas of the least significant column of the natural binary scale with which it is to be used and occurring in the same cyclic repetition.

8. For use with a natural binary scale a reader comprising: a plate having a plurality $n$ of columns of effectively opaque and effectively transparent durable areas, where $n$ is the number of digits in the binary scale, adjacent columns progressing from one side of the reader connoting successively greater digital significance, said reader having one class of such reader areas disposed about a center line, said reader areas in each column more significant than the least significant column of the reader being identically finite and of lesser columnwise dimension than like areas of the corresponding column of the natural binary scale with which it is to be used, the edges of each of two first said reader areas centrally located in each column more significant than the least significant column of the reader being contiguous with the center line, said reader areas occurring, in each direction along the column away from the center line, in the same cyclic repetition as the like areas of the corresponding column of the natural binary scale with which the reader is to be used, the resulting array of said reader areas in each column of the reader more significant than the least significant column of the reader being symmetrically disposed about said center line, said reader areas of the least significant column of the reader being identically finite and of up to twice the columnwise dimension of like areas of the least significant column of the natural binary scale with which the reader is to be used and occurring in the same cyclic repetition.

9. In a binary scale and reader combination: a natural binary scale comprising a plate having effectively opaque and effectively transparent durable areas, one class of such areas being arranged in accordance with a natural binary progression having a plurality $n$ of columns and a plurality of $2^n$ rows, where $n$ is the number of digits in the scale adjacent columns progressing from one side of the scale having successively greater digital significance; and a reader comprising a plate having a plurality $n$ of columns of effectively opaque and effectively transparent durable areas mounted in superposition on said scale for contiguous movement relative thereto in the direction of the scale columns, said reader having said one class of such reader areas disposed about a center line parallel to the rows of the scale, with the least significant column of said reader areas positioned above the least significant column of the scale, said reader areas in each column of the reader more significant than the least significant column being identically finite and of lesser columnwise dimension than the underlying like areas of the scale, the edges of each of two first said reader areas centrally located in each column more significant than the least significant column of the reader being contiguous with the center line, said reader areas occurring, in each direction along the column away from the center line, in the same cyclic repetition as the like areas of the corresponding underlying column of the scale, the resulting array of said reader areas, in each column of the reader more significant than the least significant column, being symmetrically disposed about said center line, said reader areas of the least significant column of the reader being identically finite and up to twice the columnwise dimension of the underlying like areas of the least significant column of the scale occurring in the same cyclic repetition.

10. In a binary scale and reader combination: a natural binary scale comprising an opaque plate having transparent durable areas arranged in accordance with a natural binary progression having a plurality $n$ of columns and a plurality of $2^n$ rows, where $n$ is the number of digits in the scale adjacent columns measured from one side of the plate having successively greater digital significance; and an opaque reader having transparent durable reader areas mounted in superposition on said scale for contiguous movement relative thereto in the direction of the scale columns, said reader having a plurality $n$ of columns of transparent reader areas disposed about a center line drawn parallel to the rows of the scale with the least significant column of said transparent reader areas positioned above the least significant column of the scale, the transparent reader areas in each column more significant than the least significant column of the reader being finite and of lesser columnwise dimension than the transparent areas of the corresponding underlying column of the scale, a transparent reader area in each more significant column lying entirely to one side of the reader center line with the one edge of said transparent reader area being contiguous with said center line and subsequent transparent reader areas to said one side of the center line occurring in the same cyclic repetition as the transparent areas of the underlying column of the scale, apart from the least significant column of the reader, the transparent areas to the other side of the center line being a mirror image of the transparent reader areas on said one side of the center line, the resulting array of transparent reader areas, apart from the least significant column of the reader, being symmetrically disposed about said center line, the transparent reader areas of the least significant column of the reader being identically finite and of up to twice the columnwise dimension of like areas of the least significant column of the natural binary scale with which it is to be used and occurring in the same cyclic repetition.

11. For use with a natural binary scale, a reader comprising: a plate having a plurality $n$ of columns of effectively opaque and effectively transparent durable areas, where $n$ is the number of digits in the binary scale, adjacent columns progressing from one side of the reader connoting successively greater digital significance, said reader having one class of such reader areas disposed about a center line, said reader areas in each column more significant than the least significant column of the reader being identically finite and having a columnwise dimension not exceeding one-half that of like areas of the corresponding column of the conventional binary scale with which it is to be used, the edges of each of two first said reader areas centrally located in each column more significant than the least significant column of the reader being contiguous with the center line, said reader areas occurring, in each direction along the column away from the center line, in the same cyclic repetition as the like areas of the corresponding column of the natural binary scale with which the reader is to be used, the resulting array of said reader areas in each column of the reader more significant than the least significant column of the reader being symmetrically disposed about said center line, said reader areas of the least significant column of the reader being identically finite and having a columnwise dimension of up to twice that of like areas of the least significant column of the natural binary scale with which it is to be used and occurring in the same cyclic repetition.

12. In a binary scale and reader combination: a natural binary scale comprising a plate having effectively opaque and effectively transparent durable areas, one class of such areas being arranged in accordance with a natural binary progression having a plurality $n$ of columns and a plurality of $2^n$ rows, where $n$ is the number of digits in the scale, adjacent columns progressing from one side of the scale having successively greater digital significance; and a reader comprising a plate having a plurality $n$ of columns of effectively opaque and effectively transparent durable areas mounted in superposition on said scale for contiguous movement relative thereto in the direction of the scale columns, said reader having one class of such reader areas disposed about a center line parallel with the rows of the scale, with the least significant column of said reader areas positioned above the least significant column of the scale, said reader areas in each column of the reader more significant than the least significant column being identically finite and having a columnwise dimension not exceeding one-half that of the underlying like areas of the scale, the edges of each of two first said reader areas centrally located in each column more significant than the least significant column of the reader being contiguous with the center line, said reader areas occurring, in each direction along the column away from the center line, in the same cyclic repetition as the like areas of the corresponding underlying column of the scale, the resulting array of said reader areas, in each column of the reader more significant than the least significant column, being symmetrically disposed about said center line, said reader areas of the least significant column of the reader being identically finite and having a columnwise dimension of up to twice that of the underlying like areas of the least significant column of the scale and occurring in the same cyclic repetition.

13. For use with a natural binary scale, a reader comprising: a plate having a plurality $n$ of columns of effectively opaque and effectively transparent durable areas, where $n$ is the number of digits in the binary scale, adjacent columns progressing from one side of the reader connoting successively greater digital significance, said reader having one class of such reader areas disposed about a center line, said reader areas in each column more significant than the least significant column of the reader being identically finite and having a columnwise dimension not exceeding one-half that of like areas of the corresponding column of the natural binary scale with which it is to be used, the edges of each of two first said reader areas centrally located in each column more significant than the least significant column of the reader being contiguous with the center line, said reader areas occurring, in each direction along the column away from the center line in the same cyclic repetition as the like areas of the corresponding column of the natural binary scale with which the reader is to be used, the resulting array of said reader areas in each column of the reader more significant than the least significant column of the reader being symmetrically disposed about said center line, said reader areas of the least significant column of the reader being identically finite and having a columnwise dimension up to twice that of like areas of the least significant column of the natural binary scale with which it is to be used and occurring in the same cyclic repetition, said reader areas in the least significant column of the reader to one side of said center line being so displaced, with respect to like reader areas to the other side of said center line, that the reader areas to one side of the center line are offset in a direction along the column with respect to any even multiple of widths of said underlying scale areas measured along the column, all of said reader areas in the least significant column to both sides of the center line being collectively so displaced with respect to said center line that the reader areas to both sides of the center line are offset in a direction along the column with respect to any even multiple of widths of said underlying scale areas measured along the column.

14. In a binary scale and reader combination: a natural binary scale comprising a plate having effectively opaque and effectively transparent durable areas, one class of such areas being arranged in accordance with a natural binary progression having a plurality $n$ of column and a plurality of $2^n$ rows, where $n$ is the number of digits in the scale, adjacent columns progressing from one side of the scale having successively greater digital significance; and a reader comprising a plate having a plurality $n$ of columns of effectively opaque and effectively transparent durable areas mounted in superposition on said scale for contiguous movement relative thereto in the direction of the scale columns, said reader having said one class of such reader areas disposed about a center line parallel with the rows of the scale, with the least significant column of said reader areas positioned above the least significant column of the scale, those reader areas in each column of the reader more significant than the least significant column being identically finite and having a columnwise dimension not exceeding one-half that of the underlying like areas of the scale, the edges of each of two first said reader areas centrally located in each column more significant than the least significant column of the reader being contiguous with the center line, said reader areas occurring, in each direction along the column away from the center line, in the same cyclic repetition as the like areas of the corresponding underlying column of the scale, the resulting array of said reader areas, in each column of the reader more significant than the least significant column, being symmetrically disposed about said center line, the reader areas of the least significant column of the reader being identically finite and having a columnwise dimension of up to twice that of the underlying like areas of the least significant column of the scale and occurring in the same cyclic repetition, said reader areas in the least significant column of the reader to one side of the center line being so displaced with respect to like reader areas to the other side of the center line that the reader areas to one side of the center line are offset in a direction along the column with respect to any even multiple of widths of said reader areas measured along the column, all of said reader areas in the least significant column to both sides of the center line being collectively so displaced with respect to said center line that the reader areas are offset in a direction along the column with respect to any even multiple of widths of said areas measured along the column.

15. For use with a natural binary scale, a reader comprising: a plate having a plurality $n$ of columns of effectively opaque and effectively transparent durable areas, where $n$ is the number of digits in the binary scale, adjacent columns progressing from one side of the reader connecting successively greater digital significance, said reader having one class of such reader areas disposed about a center line, those reader areas in each column more significant that the least significant column of the reader being identically finite and having a columnwise dimension not exceeding one-half that of like areas of the corresponding column of the natural binary scale with which the reader is to be used, the edges of each of two first said reader areas centrally located in each column more significant than the least significant column of the reader being contiguous with the center line, said reader areas occurring, in each direction along the column away from the center line, in the same cyclic repetition as the like areas of the corresponding column of the natural binary scale with which the reader is to be used, the resulting array of said reader areas in each column of the reader more significant than the least significant column being symmetrically disposed about said center line, said reader areas of the least significant column of the reader being identically finite and having a columnwise dimension of up to twice that of like areas of the least significant column of the natural binary scale with which the reader is to be used and occurring in the same cyclic repetition, said reader areas in the least significant column of the reader to one side of said center line being displaced, with respect to like reader areas to the other side of said center line, by a columnwise distance less than the equivalent of an even multiple of widths of said reader areas measured along the column in the least significant column of the reader, all of those reader areas in the least significant column to both sides of the center line being collectively displaced with respect to said center line, by a columnwise distance less than the equivalent of an even multiple of widths of said reader areas measured along the column.

16. In a binary scale and reader combination: a natural binary scale comprising a plate having effectively opaque and effectively transparent durable areas, one class of such areas being arranged in accordance with a natural binary progression having a plurality $n$ of column and a plurality of $2^n$ rows, where $n$ is the number of digits in the scale, adjacent columns progressing from one side of the scale having successively greater digital significance; and a reader comprising a plate having a plurality $n$ of columns of effectively opaque and effectively transparent durable areas mounted in superposition on said scale for contiguous relative movement therewith in the direction of the scale columns, said reader having said one class of such reader areas disposed about a center line paralle to the rows of the scale, with the last significant column of said reader areas positioned above the least significant column of the scale, those reader areas in each column of the reader more significant than the least significant column being identically finite and having a columnwise dimension not exceeding one-half that of the underlying like areas of the scale, the edges of each of two first said reader areas centrally located in each column more significant than the least significant column of the reader being contiguous with the center line, said reader areas occurring, in each direction along the column away from the center line, in the same cyclic repetition as the like areas of the corresponding underlying column of the scale, the resulting array of said reader areas, in each column of the reader more significant than the least significant column, being symmetrically disposed about said center line, those reader areas of the least significant column of the reader being identically finite and having a columnwise dimension, of up to twice that of the underlying like areas of the least significant column of the scale and occurring in the same cyclic repetition, those reader areas in the least significant column of the reader to one side of the center line being displaced with respect to like reader areas to the other side of the center line by a columnwise distance less than the equivalent of an even multiple of widths of said reader areas in the least significant column of the reader measured along the column, all of those reader areas in the least significant column to both sides of the center line being collectively displaced with respect to said center line by a columnwise distance less than the equivalent of an even multiple of widths of said reader areas measured along the colunm.

17. For use with a natural binary scale, a reader comprising: a plate having a plurality $n$ of columns of effectively opaque and effectively transparent durable areas, where $n$ is the number of digits in the binary scale, adjacent columns progressing from one side of the reader connoting successively greater digital significance, said reader having one class of such reader areas disposed about a center line, those reader areas in each column more significant than the least significant column of the reader being identically finite and having a columnwise dimension not exceeding one-half that of like areas of the corresponding column of the natural binary scale with which the reader is to be used, the edges of each of two first said reader areas centrally located in each column more significant than the least significant column of the reader being contiguous with the center line, said reader areas occurring, in each direction along the column away from the center line, in the same cyclic repetition as the like areas of the corresponding column of the natural binary scale with which the reader is to be used, the resulting array of said reader areas in each column of the reader more significant than the least significant column being symmetrically disposed about said center line, the reader areas of the least significant column of the reader being of the same columnwise dimension as like areas of the least significant column of the natural binary scale with which the reader is to be used and occurring in the same cyclic repetition, those reader areas in the least significant column of the reader to one side of said center line being displaced, with respect to like reader areas to the other side of said center line, by a columnwise distance less than the equivalent of a complete cycle in the least significant column of the natural binary scale used, all of said reader areas in the least significant column to both sides of the center line being collectively displaced with respect to said center line, by a columnwise distance less than the equivalent of a complete cycle in the least significant column of the natural binary scale used.

18. In a binary scale and reader combination: a natural binary scale comprising a plate having effectively opaque and effectively transparent durable areas, one class of such areas being arranged in accordance with a natural binary progression having a plurality $n$ of column and a plurality of $2^n$ rows, where $n$ is the number of digits in the scale, adjacent columns progressing from one side of the scale having successively greater digital significance; and a reader comprising a plate having a plurality $n$ of columns of effectively opaque and effectively transparent durable areas mounted in superposition on said scale for contiguous movement relative thereto in the direction of the scale columns, said reader having said one class of such reader areas disposed about a center line parallel to the rows of the scale, with the least significant column of said reader areas positioned above the least significant column of the scale, those reader areas in each column of the reader more significant than the least significant column being identically finite and having a columnwise dimension not exceeding one-half that of the underlying like areas of the scale, the edges of each of two first said reader areas centrally located in each column more significant than the least significant column of the reader being contiguous with the center line, said reader areas occurring in each direction along the column away from the center line, in the same cyclic repetition as the like areas of the corresponding underlying column of the scale, the resulting array of said reader areas, in each column of the reader more significant than the least significant column, being symmetrically disposed about said center line, the reader areas of the least significant column of the reader being of the same columnwise dimension as the underlying like areas of the least significant column of the scale and occurring in the same cyclic repetition, those reader areas in the least significant column of the reader to one side of the center line being displaced with respect to like reader areas to the other side of the center line by a columnwise distance less than the equivalent of a complete cycle in the least significant column of the natural binary scale, all of said reader areas to both sides of the center line being collectively displaced with respect to said center line by an amount up to the equivalent of a compelte cycle in the least significant column of the natural binary scale.

19. In a binary scale and reader combination: a natural binary scale comprising an opaque plate having transparent durable areas arranged in accordance with a natural binary progression having a plurality $n$ of columns and a plurality of $2^n$ rows, where $n$ is the number of digits in the scale, adjacent columns measured from one side of the plate having successively greater digital significance; and an opaque reader, having transparent durable reader areas, mounted in superposition on said scale for contiguous movement relative thereto in the direction of the scale column, said reader having a plurality $n$ of columns of transparent durable reader areas disposed about a center line parallel to the rows of the scale with the least significant column of said transparent areas positioned above the least significant column of the scale, those transparent reader areas in each column of the reader more significant than the least significant column having a columnwise dimension equal to one-half that of the transparent areas of the corresponding underlying column of the scale, the edges of each of two first transparent reader areas centrally located in each more significant column of the reader being contiguous with the center line, the transparent reader areas occurring, in each direction along the column away from the center line, in the same cyclic repetition as the transparent areas of the underlying column of the scale, the resulting array of transparent reader areas, apart from the least significant column of the reader, being symmetrically disposed about said center line, the transparent reader areas of the least significant column of the reader being of the same columnwise dimension as the underlying transparent areas of the least significant column of the scale, said transparent areas being spaced apart along the column by distances equal to their columnwise dimension, the first complete transparent area to one side of the center line starting at a distance therefrom equal to 2.75 times the columnwise dimension of the transparent reader areas in said column, the transparent reader areas to the other side of the center line starting at said one side thereof at a distance therefrom equal to 0.25 times the columnwise dimension of the transparent reader areas in said column and progressing to said other side of the center line.

20. The combination as set forth in claim 19 wherein the transparent and opaque areas of the scale and reader are reversed.

21. For use with a natural binary scale, a reader comprising: a plate having a plurality $n$ of columns of effectively opaque and effectively transparent durable areas, where $n$ is the number of digits in the binary scale, adjacent columns progressing from one side of the reader connoting successively greater digital significance, said reader having one class of such reader areas disposed about a center line, said reader areas in each column more significant than the least significant column of the reader being identically finite and having columnwise dimensions not exceeding one-half the columnwise dimension of like areas of the corresponding underlying column of the natural binary scale with which the reader is to be used, the edges of each of two first said reader areas centrally located in each column more significant than the least significant column of the reader being contiguous with the center line, said reader areas occurring in each direction along the column away from the center line, in the same cyclic repetition as the like areas of the corresponding column of the natural binary scale with which the reader is to be used, the resulting array of said reader areas in each column of the reader more significant than the least significant column being symmetrically disposed about said center line, said reader areas of the least significant column of the reader being the same dimension, measured along the column, as like areas of the least significant column of the natural binary scale with which the reader is to be used and occurring at the same cyclic repetition, said reader areas in the least significant column of the reader to one side of said center line being so displaced, with respect to like reader areas to the other side of said center line, that the reader areas to one side of the center line are offset in a direction along the column a distance, measured along the column, equivalent to a complete cycle in the least significant column of the natural binary scale used, all of said reader areas in the least significant column to both sides of the center line being collectively so displaced with respect to said center line, that the reader areas are offset in a direction along the column a distance, measured along the column, equivalent to a complete cycle in the least significant column of the natural binary scale used.

22. In a binary scale and reader combination: a natural binary scale comprising a plate having effectively opaque and effectively transparent durable areas, one class of such areas being arranged in accordance with a natural binary progression having a plurality $n$ of columns and a plurality of $2^n$ rows, where $n$ is the number of digits in the scale, adjacent columns, progressing from one side of the scale, having successively greater digital significance; and a reader comprising a plate having a plurality $n$ of columns of effectively opaque and effectively transparent durable areas mounted in superposition on said scale for contiguous movement relative thereto in the direction of the scale columns, said reader having said one class of such reader areas disposed about a center line parallel to the rows of the scale, with the least significant column of said reader areas positioned above the least significant column of the scale, said reader areas in each column of the reader more significant than the least significant column being identically finite but no more than one-half the dimension, measured along the column, of the underlying like areas of the scale, the edges of each of two first said reader areas centrally located in each column more significant than the least significant column of the reader being contiguous with the center line, said reader areas occurring in each direction along the column away from the center line, in the same cyclic repetition as the like areas of the corresponding underlying column of the scale, the resulting array of said reader areas, in each column of the reader more significant than the least significant column, being symmetrically disposed about said center line, said reader areas of the least significant column of the reader being the same dimension, measured along the column, as the underlying like areas of the least significant column of the scale and occurring in the same cyclic repetition, said reader areas in the least significant column of the reader to one side of the center line being displaced with respect to like reader areas to the other side of the center line by such an amount that the reader areas to one side of the center line are offset in a direction along the column a distance, measured along the column, equivalent to a complete cycle in the least significant column of the natural binary scale used and all of said reader areas in the least significant column to both sides of the center line being collectively so displaced with respect to said center line that the reader areas are offset in a direction along the column a distance, measured along the column, equivalent to a complete cycle in the least significant column of the natural binary scale used.

23. For use with a natural binary scale, a reader comprising: a plate having a plurality $n$ of columns of effectively opaque and effectively transparent durable areas, where $n$ is the number of digits in the binary scale, adjacent columns progressing from one side of the reader connoting successively greater digital significance, said reader having one class of such reader areas disposed about a center line, the reader areas in each column of the reader being identically finite but no more than one-half the dimension, measured along the column, of like areas of the corresponding column of the natural binary scale with which the reader is to be used, the edges of each of two first said reader areas centrally located in each column more significant than the least significant column of the reader being contiguous with the center line and said reader areas occurring in each direction, along the column, away from the center line in the same cyclic repetition as the like areas of the corresponding column of the natural binary scale with which the reader is to be used, the resulting array of said reader areas in each column of the reader more significant than the least significant column of the reader being symmetrically disposed about said center line.

24. In a binary scale and reader combination: a natural binary scale comprising a plate having effectively opaque and effectively transparent durable areas, one class of such areas being arranged in accordance with a natural binary progression having a plurality $n$ of columns and a plurality of $2^n$ rows, where $n$ is the number of digits in the scale, adjacent columns, progressing from one side of the scale, having successively greater digital significance; and a reader comprising a plate having a plurality $n$ of columns of effectively opaque and effectively transparent durable areas mounted in superposition on said scale for contiguous movement relative thereto in the direction of the scale columns, said reader having said one class of such reader areas disposed about a center line parallel to the rows of the scale, with the least significant column of said reader areas positioned above the least significant column of the scale, said reader areas in each column of the reader being identically finite but no more than one-half the dimension, measured along the column, of the underlying like areas of the scale, the edges of each of two first said reader areas centrally located in each column of the reader being contiguous with the center line, said reader areas occurring in each direction, along the column, away from the center line in the same cyclic repetition as the like areas of the corresponding underlying column of the scale, the resulting array of said reader areas, in each column of the reader being symmetrically disposed about said center line.

25. In a binary scale and reader combination: a natural binary scale comprising an opaque plate having transparent durable areas arranged in accordance with a natural binary progression having a plurality $n$ of columns and a plurality of $2^n$ rows, where $n$ is the number of digits in the scale, adjacent column, measured from one side of the plate, having successively greater digital significance; and an opaque reader having transparent durable reader areas mounted in superposition on said scale for contiguous movement relative thereto in the direction of the scale columns, said reader having a plurality $n$ of columns of transparent reader areas with the least significant column of said transparent reader areas positioned above the least significant column of the scale, the transparent reader areas in each column of the reader being finite but no more than one-half the dimension measured along the column of the transparent areas of the corresponding underlying column of the scale, a transparent reader area in each column lying entirely to one side of a center line drawn parallel to the rows of the scale, with the one edge of said transparent reader area being contiguous with said center line and subsequent transparent reader areas to said one side of the center line occurring in the same cyclic repetition as the transparent areas of the underlying column of the scale, the transparent areas to the other side of the center line being a mirror image of the transparent reader areas on said one side of the center line, the resulting array of transparent reader areas of the reader being symmetrically disposed about said center line.

26. The combination as set forth in claim 25 wherein the transparent and opaque areas of the scale and reader are reversed.

References Cited in the file of this patent

UNITED STATES PATENTS 2,747,797 Beaumont ............ May 29, 1956